(12) United States Patent
Keaton et al.

(10) Patent No.: US 7,617,146 B2
(45) Date of Patent: Nov. 10, 2009

(54) FACTORING SYSTEM AND METHOD

(75) Inventors: G. David Keaton, Harrison, AR (US); Samara Keaton, Harrison, AR (US)

(73) Assignees: Primerevenue, Inc., Atlanta, GA (US); Millennia Ventures, Inc., Sherman Oaks, CA (US)

( * ) Notice: Subject to any disclaimer, the term of this patent is extended or adjusted under 35 U.S.C. 154(b) by 1378 days.

(21) Appl. No.: 09/947,062

(22) Filed: Sep. 5, 2001

(65) Prior Publication Data

US 2007/0174191 A1    Jul. 26, 2007

Related U.S. Application Data

(60) Provisional application No. 60/230,010, filed on Sep. 5, 2000.

(51) Int. Cl.
*G06Q 40/00* (2006.01)
(52) U.S. Cl. .......................................... 705/37; 705/35
(58) Field of Classification Search ........................ None
See application file for complete search history.

(56) References Cited

U.S. PATENT DOCUMENTS 4,799,156 A * 1/1989 Shavit et al. .................. 705/26
5,694,552 A * 12/1997 Aharoni ........................ 705/37
5,717,989 A * 2/1998 Tozzoli et al. ................ 705/37
5,818,343 A * 10/1998 Sobel et al. ............. 340/815.65
6,934,692 B1 * 8/2005 Duncan ........................ 705/35
7,047,219 B1 * 5/2006 Martin et al. ................. 705/37
7,363,270 B2    4/2008 Iversen
2002/0062258 A1 * 5/2002 Bailey et al. ................. 705/26
2003/0018563 A1    1/2003 Kilgour et al.

OTHER PUBLICATIONS

Borgman, R. "Factoring for small business customers", Journal of Lending & Credit Risk Management, Feb. 1996.*
FactorWorks 2.0 Checkpoint Document of Feb. 24, 2000.

* cited by examiner

*Primary Examiner*—Hani Kazimi
*Assistant Examiner*—Olabode Akintola
(74) *Attorney, Agent, or Firm*—Nelson Mullins Riley & Scarborough, LLP

(57) ABSTRACT

A computerized system and method for facilitating proposed factoring transactions between a funding source and a client in which the funding source advances funds to the client based on accounts receivable to the client by one or more customers on one or more invoices includes a computer program that receives instructions from a client to submit one or more invoices to a funding source for an advance of funds on accounts receivable on the chosen invoices and that provides access to invoice data to a funding source for determining whether the funding source will advance funds on the chosen invoices.

52 Claims, 55 Drawing Sheets eRevenue

PLEASE PROVIDE THE INFORMATION ABOUT YOUR COMPANY REQUESTED BELOW. ONCE YOU HAVE FILLED THIS IN CLICK ON THE "NEXT" BUTTON TO CONTINUE TO THE NEXT STEP

[ NEXT ]

[ CANCEL ]

| COMPANY INFORMATION | |
|---|---|
| BUSINESS NAME | |
| PORTAL ID # | |
| DUN & BRADSTREET NR (DUNS #) | |
| ADDRESS 1 | |
| ADDRESS 2 | |
| CITY | |
| STATE/PROVINCE | ▽ |
| ZIP/POSTAL CODE | |
| COUNTRY | USA ▽ |
| WEB SITE | |
| CONTACT INFORMATION | |
| CONTACT NAME | |
| TITLE | |
| PHONE # | |
| FAX # | |
| E-MAIL ADDRESS | |
| YOUR BUSINESS | |
| FORM OF BUSINESS STRUCTURE | ▽ |
| YEAR BUSINESS ESTABLISHED | |
| SECTOR / INDUSTRY | |
| STANDARD INDUSTRY CODE (SIC) | YOU MUST SELECT THE SECTOR / INDUSTRY FIRST. |
| FINANCIAL INFORMATION | |
| REQUESTED CREDIT LINE AMOUNT | $0.0 USD ▽ |

FIG. 4A

| INDUSTRY FIRST | | |
|---|---|---|
| FINANCIAL INFORMATION | | |
| REQUESTED CREDIT LINE AMOUNT | $0.0 | USD |
| MONTHLY SALES (ACTUAL OR ANTICIPATED) | | USD |
| TOTAL OPEN A/R AMOUNT | | USD |
| RECEIVABLES CURRENT (LESS THAN 30 DAYS) | | USD |
| RECEIVABLES AGED 31-60 DAYS | | USD |
| RECEIVABLES AGED 61-90 DAYS | | USD |
| RECEIVABLES AGED 91+ DAYS | | USD |
| QUESTIONS | | |
| ARE YOUR RECEIVABLES CURRENTLY PLEDGED AS COLLATERAL TO ANY INSTITUTION ON ANY LOAN? | | |
| ARE YOU A CONTRACTOR WHICH EMPLOYS SUB-CONTRACTORS OR DO YOU HAVE PROGRESS BILLING? | | |
| DO YOU PRIMARILY CONDUCT CONSUMER TRANSACTIONS? | | |
| DO YOU HAVE ANY PENDING CRIMINAL CHARGES OR LAWSUITS AGAINST YOUR BUSINESS? | | |
| HAS YOUR BUSINESS EVER FILED BANKRUPTCY OR RECEIVERSHIP? | | |
| THE GROSS SALES OF YOUR BUSINESS ARE | | |
| YOUR A/P ARE CURRENTLY | | |
| THE NET WORTH OF YOUR BUSINESS | | |
| HOW LONG HAVE YOU BEEN IN BUSINESS UNDER THE CURRENT MANAGEMENT STRUCTURE? | | |
| DO YOU OR HAVE YOU EVER HAD LIENS OR JUDGEMENTS FILED AGAINST YOUR BUSINESS? | | |
| DO YOU HAVE AN EXISTING TAX LIEN? | | |
| TAX LIEN AMOUNT | | USD |
| DO YOU HAVE AN EXISTING PAYMENT AGREEMENT? | | |
| DO YOU HAVE AN EXISTING JUDGEMENT LIEN? | | |
| JUDGEMENT LIEN AMOUNT | | USD |
| DO YOU HAVE AN EXISTING PAYMENT AGREEMENT? | | |

NEXT
CANCEL

FIG. 4A (CONT)

eRevenue

CUSTOMERS OF CLIENT

CLICK "ADD CUSTOMER" TO PROVIDE INFORMATION ON UP TO 10 OF YOUR LARGEST CUSTOMERS.
CLICK ON THE NAME TO UPDATE INFORMATION ON ANY IN THIS LIST.
CLICK "NEXT" WHEN YOU ARE DONE.

| NAME | CONTACT NAME | PHONE |
|------|--------------|-------|
|      |              |       |

Buttons: ADD CUSTOMER, NEXT, BACK, CANCEL

FIG. 4B

--- eRevenue

OWNERS OF CUSTOMER

CLICK "ADD OWNER" TO PROVIDE INFORMATION ON ANYONE OWNING MORE THAN 10% OF THE BUSINESS.
CLICK ON THE NAME TO UPDATE INFORMATION ON ANY IN THIS LIST.
CLICK "NEXT" WHEN YOU ARE DONE.

| NAME | PHONE |
|------|-------|
|      |       |

Buttons: ADD OWNER, NEXT, BACK, CANCEL

FIG. 4D eRevenue

CUSTOMER
PLEASE COMPLETE THE FOLLOWING INFORMATION FOR THIS CUSTOMER

| GENERAL CUSTOMER INFORMATION | |
|---|---|
| CUSTOMER NAME | |
| DUN & BRADSTREET NR (DUNS #) | |
| ADDRESS 1 | |
| ADDRESS 2 | |
| CITY | |
| STATE / PROVINCE | |
| ZIP / POSTAL CODE | |
| COUNTRY | USA |
| CONTACT NAME | |
| CONTACT PHONE | |

| CUSTOMER BUSINESS | |
|---|---|
| SECTOR/INDUSTRY CUSTOMER IS IN? | |
| STANDARD INDUSTRY CODE (SIC) | YOU MUST SELECT THE SECTOR / INDUSTRY FIRST. |
| HOW LONG HAVE YOU DEALT WITH THIS CUSTOMER? | |
| WHAT PERCENTAGE OF YOUR SALES ARE WITH THIS CUSTOMER? | |

| MOST COMMON INVOICE TERMS WITH THIS CUSTOMER | |
|---|---|
| TERMS DISCOUNT % | |
| TERMS NUMBER OF DAYS | |
| TERMS TO APPLY | INVOICE PAID BY DATE |
| PAID BY DATE / DAYS | |

[ADD]
[CANCEL]

FIG. 4C eRevenue

PLEASE COMPLETE THE FOLLOWING INFORMATION FOR THIS OWNER:

| OWNER DETAIL | |
|---|---|
| FIRST NAME | |
| MIDDLE NAME | |
| LAST NAME | |
| SSN | |
| TITLE | |
| ADDRESS 1 | |
| ADDRESS 2 | |
| CITY | |
| STATE/PROVINCE | ▼ |
| ZIP/POSTAL CODE | |
| COUNTRY | USA ▼ |
| HOME PHONE | |
| NET WORTH (ASSETS LESS LIABILITIES | ▼ |
| RESIDENCE STATUS | ▼ |
| HOW LONG HAS THIS OWNER WORKED IN THIS INDUSTRY? | ▼ |

ADD

CANCEL

*FIG. 4E*

| START MENU | eREV 2.0 |
|---|---|

QUICK LINKS
- REGION LIST
- BRANCH LIST
- SEARCH

CLIENT LIST FOR

CLIENT ACCESS

INFORMATION

FUNDING

CLIENT GENERAL

LOCATIONS

PRINCIPALS

PROFESSIONAL

BANKING

BACKGROUND

PROCEDURES

NOTES

CREDIT SCORING MATRIX

BROKER LIST

| GENERAL | |
|---|---|
| COMPANY NAME | |
| D/B/A | |
| A.K.A. | |
| ABBREV. NAME | |
| ORIG. CONTRACT DATE | 1/2/00 |
| LAST RENEWAL DATE | |
| RENEWAL DUE DATE | 1/2/01 |
| LOAN OFFICER | COOLEY |
| BUSINESS FORM | UNKNOWN |
| INCORPORATED STATE | GA |
| ESTABLISHED | 1/2/98 |
| CLIENT STATUS | ACTIVE |
| RECORD CREATED | 7/1/00 6:16:16 PM |
| CLIENT CODE | MMC |
| E-MAIL ADDRESS | NONE |
| URL | NA |
| TERMS TO APPLY | INVOICE PAID BY DATE |
| PAID BY DATE/DAYS | 10 |
| DISCOUNT | 2 |
| DISCOUNT TERMS | 30 |
| ADVANCE AGAINST INVOICE | BY FULL INVOICE AMOUNT |
| VERIFICATION REQUIRED | YES |

SAVE     CANCEL

MAIN MENU
POSTING PERIOD: 5/24/00

| | CLIENT | | |
|---|---|---|---|
| RATIOS | SOLID | 1 | 1 |
| TRADE CREDIT | CURRENT | 1 | 1 |
| FINANCIAL STRENGTH | STRONG | 1 | 1 |
| HISTORY | 10+ YEARS | 1 | 1 |
| LIENS | NONE | 1 | 1 |

| | CUSTOMER | | |
|---|---|---|---|
| EXPERIAN | VERY GOOD | 1 | 1 |
| D&B PAYDEX | 80% OF CUST 1 OR 2 | 1 | 1 |
| CUSTOMER HISTORY | 10+ YEARS | 1 | 1 |
| CUSTOMER REFERENCES | PROMPT | 1 | 1 |

CLIENT:
CREDIT
REQUESTED LINE AMOUNT 300,000   SIC CODE 5157   RECALCULATE  APPROVED

| TOTALS | |
|---|---|
| CLIENT TOTAL | 1 |
| CUSTOMER TOTAL | 1 |
| OWNER/GUARANTOR | 1 |
| GRAND TOTAL | 3 |

| SCORING LEGEND | |
|---|---|
| LESS THAN $200,000.00 | 7 |
| $200,000.00 TO $500,000.00 | 6 |
| $500,000.00 + | 5 |

START MENU
QUICK LINKS
- REGION LIST
- BRANCH LIST
- SEARCH
CLIENT LIST FOR NO.
CLIENT ACCESS
INFORMATION
FUNDING
CLIENT GENERAL
LOCATIONS
PRINCIPALS
PROFESSIONAL

FIG. 9B (cont.)

eREV 2.0

CLIENT   ADD NEW ADVANCE ● OPEN ADVANCES ○ ALL ADVANCES

ADVANCES

| | | | | INVOICES | | | | INVOICES (NOT ADVANCED) | | |
|---|---|---|---|---|---|---|---|---|---|---|
| CLOSED | POSTED | DATE | CODE | INVOICES DISC | ORIG. ADVANCE | INT. RESERVE | PAYMENTS | (OVER) SHORT | DISCOUNT FEE | INTEREST REV |
| ☐ | ○ | 12/23/99 | MIS991223A | $9,475.87 USD | $7,580.70 USD | $1,895.17 USD | $8,104.87 USD | $85.00 USD | $216.97 USD | $70.11 USD |
| ☐ | ○ | 12/28/99 | MIS991228A | $30,635.35 USD | $24,508.28 USD | $6,127.07 USD | $26,611.30 USD | $1,007.15 USD | $760.36 USD | $251.89 USD |
| ☐ | ○ | 12/30/99 | MIS991230A | $24,763.25 USD | $19,810.60 USD | $4,952.65 USD | $13,022.75 USD | $5,890.50 USD | $555.63 USD | $70.31 USD |
| ☐ | ○ | 1/7/00 | MIS000107A | $5,239.50 USD | $4,191.60 USD | $1,047.90 USD | $2,202.15 USD | $502.85 USD | $70.65 USD | $5.17 USD |
| ☐ | ○ | 1/13/00 | MIS000113A | $10,228.45 USD | $8,182.76 USD | $2,045.69 USD | $2,483.75 USD | $0.00 USD | $41.50 USD | $5.76 USD |
| ☐ | ○ | 1/20/00 | MIS000120A | $4,261.50 USD | $3,409.20 USD | $852.30 USD | $0.00 USD | $0.00 USD | $0.00 USD | $0.00 USD |
| ☐ | ○ | 1/21/00 | MIS000121A | $9,498.75 USD | $7,599.00 USD | $1,899.75 USD | $9,998.75 USD | $0.00 USD | $393.58 USD | $175.82 USD |
| ☐ | ○ | 1/28/00 | MIS000128A | $3,459.65 USD | $2,767.72 USD | $691.93 USD | $0.00 USD | $0.00 USD | $0.00 USD | $0.00 USD |
| ☐ | ○ | 2/1/00 | MIS000201A | $4,944.96 USD | $3,955.97 USD | $988.99 USD | $0.00 USD | $0.00 USD | $0.00 USD | $0.00 USD |

*FIG. 10A*

START MENU
QUICK LINKS
-REGION LIST
-BRANCH LIST
-SEARCH
CLIENT LIST FOR
INFORMATION
FUNDING
ADVANCES
CUSTOMERS
RATES
RESERVE

| FIG. 10A | FIG.10A (cont. 1) |
|---|---|
| FIG.10A (cont. 2) | FIG.10A (cont. 3) | eREV 2.0

CLIENT  ADD NEW ADVANCE  ⦿ OPEN ADVANCES  ○ ALL ADVANCES

INVOICES (NOT ADVANCED)

| RECOVERED ADV | REBATE PAID | NET REBATE PAYABLE | AR BALANCE | ACCR.DISC. FEE | ACCR.INT. REV | UNRECOVERED ADVANCE | NET RESERVE | COMMISSION FEE | GUARANTOR FEE | INSURANCE FEE | MIN INV. CHARGE | WIRE FEE |
|---|---|---|---|---|---|---|---|---|---|---|---|---|
| $6,551.90 USD | $400.53 USD | $158.66 USD | $1,286.00 USD | $57.87 USD | $40.67 USD | $1,028.80 USD | $158.66 USD | $0.00 USD | $0.00 USD | $0.00 USD | $0.00 USD | $0.00 USD |
| $22,094.76 USD | $1,940.22 USD | $375.39 USD | $3,016.90 USD | $135.76 USD | $92.23 USD | $2,413.52 USD | $375.39 USD | $0.00 USD | $0.00 USD | $0.00 USD | $0.00 USD | $0.00 USD |
| $15,130.60 USD | $310.64 USD | $730.37 USD | $5,850.00 USD | $263.25 USD | $176.38 USD | $4,680.00 USD | $730.37 USD | $0.00 USD | $0.00 USD | $0.00 USD | $0.00 USD | $0.00 USD |
| $2,164.00 USD | -$171.84 USD | $320.69 USD | $2,534.50 USD | $114.05 USD | $72.16 USD | $2,027.60 USD | $320.69 USD | $0.00 USD | $0.00 USD | $0.00 USD | $0.00 USD | $0.00 USD |
| $1,987.00 USD | $300.06 USD | $989.69 USD | $7,744.70 USD | $348.51 USD | $210.74 USD | $6,195.76 USD | $989.69 USD | $0.00 USD | $0.00 USD | $0.00 USD | $0.00 USD | $0.00 USD |
| $0.00 USD | $0.00 USD | $550.82 USD | $4,261.50 USD | $191.77 USD | $109.71 USD | $3,409.20 USD | $550.82 USD | $0.00 USD | $0.00 USD | $0.00 USD | $0.00 USD | $0.00 USD |
| $7,999.00 USD | $140.59 USD | -$64.73 USD | -$500.00 USD | -$22.50 USD | -$12.77 USD | -$400.00 USD | -$64.73 USD | $0.00 USD | $0.00 USD | $0.00 USD | $0.00 USD | $0.00 USD |
| $0.00 USD | $0.00 USD | $452.97 USD | $3,459.65 USD | $155.68 USD | $83.28 USD | $2,767.72 USD | $452.97 USD | $0.00 USD | $0.00 USD | $0.00 USD | $0.00 USD | $0.00 USD |
| $0.00 USD | $0.00 USD | $651.56 USD | $4,944.96 USD | $222.52 USD | $114.91 USD | $3,955.97 USD | $651.56 USD | $0.00 USD | $0.00 USD | $0.00 USD | $0.00 USD | $0.00 USD |

| FIG.10A | FIG.10A (cont. 1) |
|---|---|
| FIG.10A (cont. 2) | FIG.10A (cont. 3) |

FIG. 10A (cont. 1)

| | | 104 | 106 | 108 | 110 | 112 | 114 | 116 | 120 | 122 |
|---|---|---|---|---|---|---|---|---|---|---|
| ☐ | ○ | 2/2/00 | MIS000202A | $13,895.00 USD | $11,116.00 USD | $2,779.00 USD | $250.00 USD | $0.00 USD | $6.26 USD | $2.14 USD |
| ☐ | ○ | 2/7/00 | MIS000207A | $2,823.06 USD | $2,258.45 USD | $564.61 USD | $3,791.02 USD | $0.00 USD | $94.34 USD | $29.36 USD |
| ☐ | ○ | 3/8/00 | MIS000308A | $200.00 USD | $160.00 USD | $40.00 USD | $0.00 USD | $0.00 USD | $0.00 USD | $0.00 USD |
| ☐ | ○ | 3/15/00 | MIS000315A | $3,120.00 USD | $124.80 USD | $2,995.20 USD | $500.00 USD | $0.00 USD | $0.00 USD | $0.09 USD |
| ☐ | ○ | 3/16/09 | MIS000316A | $6,917.16 USD | $5,533.72 USD | $1,383.44 USD | $1,200.00 USD | $0.00 USD | $0.00 USD | $0.00 USD |
| ☐ | ○ | 5/24/00 | MIS000524P | $0.00 USD | $0.00 USD | $0.00 USD | $0.00 USD | $0.00 USD | $0.00 USD | $0.00 USD |
| ☐ | ○ | 5/24/00 | MIS000524O | $508.50 USD | $406.80 USD | $101.70 USD | $0.00 USD | $0.00 USD | $0.00 USD | $0.00 USD |

MAIN MENU  POSTING PERIOD: 5/24/00

| FIG.10A | FIG.10A (cont. 1) |
|---|---|
| FIG.10A (cont. 2) | FIG.10A (cont. 3) |

| FIG.10A | FIG.10A (cont. 1) |
|---------|-------------------|
| FIG.10A (cont. 2) | FIG.10A (cont. 3) |

| 118 | 124 | 126 | 130 | 132 | 128 | 134 | | | | | |
|---|---|---|---|---|---|---|---|---|---|---|---|
| $200.00 USD | $0.00 USD | $1,800.74 USD | $13,645.00 USD | $614.03 USD | $314.23 USD | $10,916.00 USD | $1,800.74 USD | $0.00 USD | $0.00 USD | $0.00 USD | $0.00 USD |
| $3,032.82 USD | $10.84 USD | -$127.58 USD | -$967.96 USD | -$43.56 USD | -$22.45 USD | -$774.37 USD | -$127.58 USD | $0.00 USD | $0.00 USD | $0.00 USD | $0.00 USD |
| $0.00 USD | $0.00 USD | $29.02 USD | $200.00 USD | $8.00 USD | $2.98 USD | $160.00 USD | $29.02 USD | $0.00 USD | $0.00 USD | $0.00 USD | $0.00 USD |
| $20.00 USD | $0.00 USD | $2,512.55 USD | $2,620.00 USD | $0.00 USD | $2.65 USD | $104.80 USD | $2,512.55 USD | $0.00 USD | $0.00 USD | $0.00 USD | $0.00 USD |
| $960.00 USD | $240.00 USD | $856.07 USD | $5,717.16 USD | $200.10 USD | $87.27 USD | $4,573.72 USD | $856.07 USD | $0.00 USD | $0.00 USD | $0.00 USD | $0.00 USD |
| $0.00 USD | $0.00 USD | $0.00 USD | $0.00 USD | $0.00 USD | $0.00 USD | $0.00 USD | $0.00 USD | $0.00 USD | $0.00 USD | $0.00 USD | $0.00 USD |
| $0.00 USD | $0.00 USD | $101.70 USD | $508.50 USD | $0.00 USD | $0.00 USD | $406.80 USD | $101.70 USD | $0.00 USD | $0.00 USD | $0.00 USD | $0.00 USD |

MAIN MENU  POSTING PERIOD: 5/24/00

| START MENU | | | | | | | | | | |
|---|---|---|---|---|---|---|---|---|---|---|
| QUICKLINKS<br>-REGION LIST<br>-BRANCH LIST<br>-SEARCH | *eREV 2.0* | | | | | | | | | |
| | CLIENT SORT ORDER [INVOICE DATE ▽] ● OPEN INVOICES ○ ALL INVOICES | | | | | | | | | |
| CLIENT<br>LIST FOR | ADVANCES | | | INVOICES | | | | INVOICES (NOT ADVANCED) | | |
| INFORMATION | CLOSED | POSTED | CUSTOMER | INV.<br>NUMBER | INV.<br>DATE | INV.ORG.<br>AMOUNT | INV./ADV.<br>AMOUNT | ADV.<br>AMOUNT | CB<br>DATE | CB<br>EXTENDED | CB<br>AMOUNT |
| FUNDING | ☐ | ○ | | 98-040-44 | 11/17/99 | $1,305.00 USD | $1,305.00 USD | $1,044.00 USD | 3/20/00 | 0 | $0.00 USD |
| | ☐ | ○ | | 1700 | 12/17/99 | $275.00 USD | $275.00 USD | $220.00 USD | 4/21/00 | 0 | $0.00 USD |
| ADVANCES | ☐ | ○ | | 1724 | 12/24/99 | $150.00 USD | $150.00 USD | $120.00 USD | 7/20/00 | 90 | $0.00 USD |
| | ☐ | ○ | | 79 | 12/31/99 | $1,634.19 USD | $1,634.19 USD | $1,307.35 USD | 4/13/00 | 0 | $0.00 USD |
| CUSTOMERS | ☐ | ○ | | 2 | 1/6/00 | $135.00 USD | $135.00 USD | $108.00 USD | 4/21/00 | 0 | $0.00 USD |
| | ☐ | ○ | | 5 | 1/6/00 | $125.00 USD | $125.00 USD | $100.00 USD | 4/21/00 | 0 | $0.00 USD |
| RATES | ☐ | ○ | | 6 | 1/6/00 | $125.00 USD | $125.00 USD | $100.00 USD | 4/21/00 | 0 | $0.00 USD |
| | ☐ | ○ | | 9 | 1/7/00 | $75.00 USD | $75.00 USD | $60.00 USD | 4/21/00 | 0 | $0.00 USD |
| RESERVE | ☐ | ○ | | 81 | 1/10/00 | $2,168.85 USD | $2,168.85 USD | $1,735.08 USD | 4/13/00 | 0 | $0.00 USD |
| | ☐ | ○ | | 20 | 1/12/00 | $150.00 USD | $150.00 USD | $120.00 USD | 4/21/00 | 0 | $0.00 USD |

[MAIN MENU]  POSTING PERIOD: 5/24/00

eREV 2.0

CLIENT (152) | SORT ORDER (154) INVOICE DATA (156) | ● OPEN INVOICES (158) ○ ALL INVOICES

INVOICES (NOT ADVANCED)

| PAYMENTS | (OVER)/ SHORT | DISC. FEE REV. | INTEREST REV. | RECOVERED | DATE CLOSED | COMMISSION FEE | GUARANTOR FEE | INSURANCE FEE | MIN. INVOICE CHARGE |
|---|---|---|---|---|---|---|---|---|---|
| | | 170 | | 168 | | 160 | 162 | 164 | 166 |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |
| $0.00 USD | $0.00 USD | $0.00 USD | $0.00 USD | $0.00 USD | | $0.00 USD | $0.00 USD | $0.00 USD | $0.00 USD |

MAIN MENU
POSTING PERIOD: 5/24/00

84

← FROM FIG. 10B

INVOICE SUBMISSION (MANUAL)

CLIENT   ADD NEW INVOICE   ADD MULTIPLE INVOICES         SORT ORDER  [INVOICE DATE ▽]

⦿ OPEN INVOICES   ○ ALL INVOICES

MULTIPLE INVOICE VERIFICATION

| ADVANCES ||||| INVOICES |||| INVOICES (NOT ADVANCED) ||
|---|---|---|---|---|---|---|---|---|---|---|
| CLOSED | VER | NA | CREDIT | CUSTOMER | INV NUMBER | INV DATE | INV ORIG AMT | INV ADV AMT | MAILED | VERIFIED |
| ☐ | ☐ | ☐ | ☐ | | 1001 | 3/30/00 | $125.00 USD | $125.00 USD | | 5/2/00 |
| ☐ | ☐ | ☐ | ☐ | | TEST 0138 | 4/1/00 | $500.00 USD | $500.00 USD | | 5/2/00 |
| ☐ | ☐ | ☐ | ☐ | | 1012 | 4/5/00 | $700.00 USD | $700.00 USD | | 6/14/00 3:34:01PM |
| ☐ | ☐ | ☐ | ☐ | | 1011 | 4/5/00 | $500.00 USD | $500.00 USD | | 6/19/00 3:52:02PM |

SELECT RATE TO REVIEW/ALTER:

| COMMISSION-INVOICE PURCHASED | | | ▽ |

204

DEFAULT VALUES

| GUARANTEE FEE | INVOICES ADVANCED | 2.15 |
|---|---|---|
| DISCOUNT | FLAT-ADVANCE AMT | 3 |
| DISCOUNT | GRADUATED-ADVANCE AMT | 4.05 |

COMMISSION - INVOICE PURCHASED

| CURRENT VALUES: | 1 | NOT-DEFAULT |
|---|---|---|
| NEW VALUES: | 1 | DEFAULT? ☑ |

[ UPDATE DATABASE ]  [ Cancel ]

| | INTEREST RATE PROFILE |
|---|---|
| INTEREST 1 | PRIME RATE |
| INTEREST 2 | LIBOR RATE 1 |
| INTEREST 3 | LIBOR RATE 2 |
| INTEREST 4 | LIBOR RATE 3 |
| INTEREST 5 | LIBOR RATE 4 |
| INTEREST 6 | WSJ LOWEST PRIME |
| INTEREST 7 | WSJ LOWEST PRIME 2 |

UPDATE  Cancel

*FIG. 19*

CREDIT SCORING

| | |
|---|---|
| CREDIT SCORE | 2 |
| CREDIT LIMIT | 25000 |
| CREDIT LIMIT NOTE | NEED BUS. REPT. OR FW HISTORY TO RAISE SCORE |
| REVIEWED BY | RENE |
| LAST REVIEW | 12/21/99 |

[SCORE CUSTOMER] [VIEW CUSTOMER AGING] [VIEW PYMT HISTORY]

| SCORE CUSTOMER | | | |
|---|---|---|---|
| CUSTOMER CREDIT LINE $25,000.00 USD | | | |
| OVERRIDE CREDIT LINE $0.00 USD REASON | | | |
| CUSTOMER SCORING | | | |
| LENGTH OF CLIENT/CUSTOMER RELATIONSHIP | 1 OR MORE BUT LESS THAN 4 YEARS ▸ | 5 ▸ | 3 |
| NOTES | | | |
| PERCENTAGE OF SALES WITH CUSTOMER | 25% TO 49% OF YOUR TOTAL SALES ▸ | 7 ▸ | 3 |
| NOTES | | | |
| EXPERIAN | GOOD ▸ | 3 ▸ | 2 |
| NOTES | | | |
| D&B PAYDEX | D&B 3 RATING WITH 50-69 PAYDEX ▸ | 2 ▸ | 3 |
| NOTES | | | |
| PAYMENT REFERENCES | WITHIN TERMS ▸ | 8 ▸ | 2 |
| NOTES | | | |
| TOTAL SCORE | | | 13 |

*FIG. 23*

| CLIENT/CUSTOMER PAYMENT STATISTICS | |
|---|---|
| AVG. INV. AMOUNT | 685.7203 |
| AVG. DAYS PAST TERMS | 0 |
| EXP. COLL. PERIOD (DEFAULT) | 76 |
| EXP. COLL. PERIOD (CALCULATED) | 59 (28) |
| # INVS PAST ECP (DEFAULT) | 32 |
| # INVS PAST ECP (CALCULATED) | 32 |
| TREND | STEADY |
| STANDARD DEVIATION | 28.0099188878061 |

*FIG. 24*

| FUNDING SOURCE PAYMENT STATISTICS | |
|---|---|
| EXP. COLL. PERIOD | 28 (4) |
| AVG. DAYS PAST TERMS | 0 |
| STANDARD DEVIATION | 47.1345591542625 |
| TREND VALUE | STEADY |
| DATE OF LAST CALCULATION | 6/7/00 8:51:46 AM |
| FIRST PAYMENT DATE | 1/2/00 |
| LAST PAYMENT DATE | 4/5/00 |
| REPOSITORY PAYMENT STATISTICS | |
| EXP. COLL. PERIOD | 28 (4) |
| AVG. DAYS PAST TERMS | 0 |
| STANDARD DEVIATION | 47.1345591542625 |
| TREND VALUE | STEADY |
| DATE OF LAST CALCULATION | 6/7/00 8:51:46 AM |
| FIRST PAYMENT DATE | 1/2/00 |
| LAST PAYMENT DATE | 4/5/00 |

*FIG. 25*

|  | STATUS | VERIFIED ○ | N/A ○ | CREDIT ○ |
|---|---|---|---|---|
| METRO | | | | |
| INVOICE (NOT ADVANCED) NOTES: | | | | |
| | INVOICE INFORMATION | | | |
| CLIENT LOCATION | | | | |
| CUSTOMER | ▷ | | | |
| INVOICE NUMBER | | | | |
| INVOICE DATE | | | | |
| INVOICE DUE DATE | | | | |
| DISCOUNT | | | | |
| DISCOUNT TERMS | | | | |
| P.O. NUMBER | | | | |
| INVOICE AMOUNT | $0.00 USD ▷ | | | |
| AMOUNT TO ADVANCE ON | $0.00 | | | |
| PROJECTED ADVANCE | $0.00 | | | |
| DATE MAILED | | | | |
| DATE VERIFIED | | | | |
| VERIFIED BY | NOT VERIFIED | | | |
| VERIFICATION METHOD | ▷ | | | |

MULTIPLE INVOICES

CLIENT LOCATION

CUSTOMER

DISCOUNT 10

DISCOUNT TERMS 10

INVOICE DUE DATE (FROM FIRST INVOICE DATE) 6/3/2000

ADVANCE AGAINST INVOICE BY DISCOUNTED INVOICE AMOUNT

| INVOICE NUMBER | INVOICE DATE | INVOICE AMOUNT/ CURRENCY | | MAIL DATE | PO NUMBER | TRACKING NUMBER |
|---|---|---|---|---|---|---|
| 121212 | 04/04/2000 | 200.00 | USD | 04/04/2000 | 1414 | Z3049380 |
| 121213 | 04/05/2000 | 550.00 | USD | 04/05/2000 | 1415 | X3948309 |
|  |  | $0.00 | USD |  |  |  |

~242

*FIG. 27* eREV 2.0

CLIENT

CURRENT DATE IS TUESDAY, JULY 04, 2000
CURRENT TIME IS 11:11:49 AM

242

INVOICES
- INVOICES NOT ADVANCED
- ADVANCED REQUEST FORM
- PAYMENT STATUSES NEEDED

INVOICES SUBMISSION
- SEND EFORM INVOICE
- INVOICE HISTORY

REPORTS
- FUNDED INVOICE AGING (BY INVOICE DATE)
- FUNDED INVOICE AGING (BY ADVANCE DATE)
- COMBINED INVOICE AGING (BY INVOICE DATE)
- COMBINED INVOICE AGING (BY ADVANCE DATE)
- DAILY PAYMENT SUMMARY
- PAYMENT STATUSES NEEDED
- INVOICES AVAILABLE FOR POTENTIAL ADVANCE
- VERIFICATION STATUS OF INVOICES NOT ADVANCED

*FIG. 28*

Form fields (rotated 90°, label → field):

- CLIENT LOCATION: [dropdown]
- CLIENT CONTACT: [dropdown]
- CUSTOMER: [field]
- CUSTOMER CONTACT: [dropdown]
- REMIT TO: UPS CAPITAL, PO BOX 911644, DALLAS, TX 75391-1644, USA
- INVOICE NUMBER / INVOICE DATE
- P.O. NUMBER / P.O. DATE
- VENDOR NUMBER / CUSTOMER NUMBER
- CURRENCY: USD [dropdown] / STORE NUMBER BILL TO NAME: ID [ ] ADDRESS 1 [ ] ADDRESS 2 [ ] CITY [ ] ST [ ] ZIP [ ] COUNTRY [ ]

SHIP TO NAME: ID [ ] ADDRESS 1 [ ] ADDRESS 2 [ ] CITY [ ] ST [ ] ZIP [ ] COUNTRY [ ]

- CARRIER NAME [ ] DISCOUNT [10] DISCOUNT TERMS [10] TRACKING NR [ ]
- INVOICE DUE DATE
- TERMS [ ] FREIGHT AMOUNT [ ] METHOD OF PAYMENT [ ] INCLUDE FREIGHT IN TOTAL ☐
- SHIPMENT DATE

| LINE# | PRODUCT ID | DESCRIPTION | QTY | UNIT PRICE | TAX AMOUNT | ADJUSTMENT AMOUNT |
|---|---|---|---|---|---|---|
| 1 | | | | | | |
| 2 | | | | | | |

MANUAL VERIFICATION

| NEW INVOICE HAS BEEN SUCCESSFULLY ADDED | | |
|---|---|---|
| INVOICE | | CUSTOMER |
| INVOICE INFORMATION | | |
| CLIENT LOCATION | ▼ | |
| CUSTOMER | ▼ | |
| INVOICE NUMBER | 132 | |
| INVOICE DATE | 5/20/00 | |
| INVOICE DUE DATE | 6/20/00 | |
| DISCOUNT | 22 | |
| DISCOUNT TERMS | 23 | |
| P.O. NUMBER | | |
| INVOICE AMOUNT | $500.00 | USD ▼ |
| AMOUNT TO ADVANCE ON | $500.00 | |
| PROJECTED ADVANCE | $400.00 | |
| DATE MAILED | 5/20/00 | |
| DATE VERIFIED | | |
| VERIFIED BY | FWADMIN | |
| VERIFICATION METHOD | VERBAL ▼ | — 248 |
| TRACKING NUMBER | | |
| DELIVERY STATUS | | |
| ☐ DO NOT ADVANCE (DNA) | | |
| UNVERIFY | VERIFY NOW | |
| RECORD CREATED: 7/3/00 10:22:58PM BY: FWADMIN | | |
| INVOICE NOTES | PAYMENTS | MEMO | OVERRIDE |
| OK | DELETE | CANCEL |

MULTIPLE INVOICE VERIFICATION

| ADVANCES | | | | INVOICES | | | INVOICES (NOT ADVANCED) | | |
|---|---|---|---|---|---|---|---|---|---|
| CLOSED | VER | NA | CREDIT | CUSTOMER | INV NUMBER | INV DATE | INV ORIG AMT | INV ADV AMT | MAILED | VERIFIED |
| ☐ | ○ | ☐ | ☐ | | 1350 | 6/29/99 | $200.00 USD | $200.00 USD | | |
| ☐ | ○ | ○ | ☐ | | 38 | 12/3/99 | $750.00 USD | $750.00 USD | | |
| ☐ | ○ | ○ | ☐ | | 80 | 1/6/00 | $1,675.96 USD | $1,675.96 USD | | |
| ☐ | ☐ | ☐ | ☐ | | 132 | 5/20/00 | $500.00 USD | $500.00 USD | 5/20/00 | |

CANCEL WITHOUT SAVING [CANCEL]

CLIENT

[SUBMIT & SAVE]  ☐ SELECT ALL   254

| | VER | CUSTOMER | INV NUMBER | INV DATE | PO NUM | INV ORG AMT | INV ADV AMT | PROJECTED ADV | DATE MAILED | DATE VERIFIED | VER METHOD | VER NOTE | DN A | VER BY | APPR |
|---|---|---|---|---|---|---|---|---|---|---|---|---|---|---|---|
| 1 | ☐ | | AUTO DONE 1 | 5/4/00 | | $3000.00 USD | $3000.00 USD | $2400.00 USD | | 5/10/00 | DOC | | ☐ | FWADM | ☐ |
| 2 | ☐ | | AUTO DONE 10 | 5/4/00 | | $100.00 USD | $100.00 USD | $80.00 USD | | 5/14/00 | AUTO | | ☐ | SYSTEM | ☐ |
| 3 | ○ | | AUTO DONE 2 | 5/4/00 | | $2500.00 USD | $2500.00 USD | $2000.00 USD | | | | | ☐ | | ☐ |
| 4 | ○ | | AUTO DONE 3 | 5/4/00 | | $2000.00 USD | $2000.00 USD | $1600.00 USD | | | | | ☐ | | ☐ |
| 5 | ○ | | AUTO DONE 4 | 5/4/00 | | $400.00 USD | $400.00 USD | $320.00 USD | | | | | ☐ | | ☐ |
| 6 | ○ | | AUTO DONE 5 | 5/4/00 | | $1500.00 USD | $1500.00 USD | $1200.00 USD | | | | | ☐ | | ☐ |
| 7 | ○ | | AUTO DONE 6 | 5/4/00 | | $300.00 USD | $300.00 USD | $240.00 USD | | | | | ☐ | | ☐ |
| 8 | ○ | | AUTO DONE 7 | 5/4/00 | | $1,000.00 USD | $1000.00 USD | $800.00 USD | | | | | ☐ | | ☐ |
| 9 | ○ | | AUTO DONE 8 | 5/4/00 | | $200.00 USD | $200.00 USD | $160.00 USD | | | | | ☐ | | ☐ |
| 10 | ○ | | AUTO DONE 9 | 5/4/00 | | $500.00 USD | $500.00 USD | $400.00 USD | | | | | ☐ | | ☐ |
| 11 | ⇧ | | RICK TEST 99 | 5/24/00 | | $5,500.00 USD | $5,500.00 USD | $4,400.00 USD | | 6/29/00 3:11:10PM | AUTO | | | SYSTEM | |

CLIENT AUTO VERIFICATION

| DELIVERY TYPE | MINIMUM AMOUNT | | MINIMUM AMOUNT | |
|---|---|---|---|---|
| DELIVERY | $1,001.00 | USD | $3,000.00 | USD |
| PICKUP | $1.00 | USD | $1,000.00 | USD |

SAVE  CANCEL

*FIG. 33*

CLIENT

INVOICES AVAILABLE FOR POTENTIAL ADVANCE ~258

| CUSTOMER NAME | INVOICE # | INVOICE DATE | ORIGINAL INV AMT | VERIFIED INV AMT | PROJECTED ADVANCE | AUTHORIZE/COMMENTS |
|---|---|---|---|---|---|---|
| | | | | | | SELECT ALL / CLEAR ALL |
| | 500 | 05/09/2000 | $565.00 USD | $508.50 USD | $457.65 USD | ☑ |
| | 801 | 05/24/2000 | $1,200.00 USD | $1,080.00 USD | $972.00 USD | ☐ |
| | 802 | 05/24/2000 | $3,800.00 USD | $3,420.00 USD | $3,078.00 USD | ☑ |
| | 889 | 05/09/2000 | $787.00 USD | $708.30 USD | $637.47 USD | ☐ |
| TOTAL ESTIMATED | | | $6,352.00 USD | $5,716.80 USD | $5,145.12 USD | |
| TOTAL EST AUTHORIZED | | | 4365 | 3928.5 | 3535.65 | |

THE ABOVE REPRESENTS AN OFFICIAL FUNDING REQUEST SUBJECT TO ALL TERMS & CONDITIONS AS SET FORTH BY CONTRACT.

[I HEREBY AGREE TO ADVANCE]

| RATE SCHEDULE |
| --- |
| [ ▷ ] — 262 |
| [ SUBMIT ] |

CLIENT
ADVANCE: 7827

| | | |
|---|---|---|
| ADVANCE CODE | MIS0005240 | ADVANCE RATE | 80.00% |
| PRIME RATE | 9.25% | POINTS OVER PRIME | 1 |
| TOTAL INVOICES DISCOUNTED | $0.00 USD | TOTAL ADVANCE AMOUNT | $0.00 USD |
| AVAILABLE CREDIT | $157,103.83 USD | TOTAL ADVANCE AMOUNT CURRENCY | $0.00 [USD ▷] |
| INITIAL RESERVE AMOUNT | $0.00 USD | PRIMARY FUNDING ACCT # | |
| RATE PROFILE | DEFAULT | WIRE FEE | $0.00  USD |

INVOICES

| INVOICES (NOT ADVANCED) | | | | ADJUSTMENT | | | |
|---|---|---|---|---|---|---|---|
| CUSTOMER | INVOICE NUMBER | INVOICE DATE | INVOICE ORIG AMT | INVOICE ADV AMT | ADVANCED AMT | CUST CREDIT LINE | INV. OVERRIDE | OVERRIDE NOTES | ECP |

266  CURRENTLY NO RECORDS ARE AVAILABLE

[ SELECT ALL ] [ CLEAR ALL ]

[ MOVE INVOICES ] [ DELETE ADVANCE ]

[ PRINT ADV SUMM ] [ PRINT VERIFICATION NOTES ] [ OK ] [ CANCEL ]

| ADVANCE: 7830 | | | |
|---|---|---|---|
| ADVANCE CODE | MIS0005240 | ADVANCE RATE | 80.00% |
| PRIME RATE | 9.25% | POINTS OVER PRIME | 0 |
| TOTAL INVOICES DISCOUNTED | $3,420.00 USD | TOTAL ADVANCE AMOUNT | $2,736.00 USD |
| AVAILABLE CREDIT | $154,367.83 USD | TOTAL ADVANCE AMOUNT CURRENCY | $2,736.00 USD |
| INITIAL RESERVE AMOUNT | $684.00 USD | PRIMARY FUNDING ACCT # | |
| | | WIRE FEE | $0.00 USD |

FIG. 35C

| VER | CUSTOMER | INV NUMBER | MT | INV ADV AMT | PROJECTED ADV | DATE MAILED | DATE VERIFIED | VER METHOD | VER NOTE | DNA | VER BY | APPR | OVER-RIDE | OVERRIDE NOTE |
|---|---|---|---|---|---|---|---|---|---|---|---|---|---|---|
| 22 ☐ | | | | | | | 3:34:01PM | | | ☑ | | | ☐ | |
| 23 ☐ | | 1013 | | $2,000.00 USD | $1,600.00 USD | | 6/14/00 3:33:57PM | AUTO MATIC | | ☑ | SYSTEM | ☑ | ☐ | |
| 24 ☐ | | 2160 | SD | $199.80 USD | $159.84 USD | | 6/23/00 2:30:17PM | AUTO MATIC | | ☑ | SYSTEM | ☑ | ☐ | |
| 25 ☐ | | 3124 | | $540.00 USD | $432.00 USD | 5/9/00 | 6/23/00 2:00:05PM | AUTO MATIC | | ☑ | SYSTEM | ☑ | ☐ | |
| 26 ☐ | | 11 | | $80.00 USD | $64.00 USD | 5/9/00 | 5/9/00 | OTHER | | ☑ | FWAD MIN | ☑ | ☐ | |
| 27 ☐ | | 51 | | $200.00 USD | $160.00 USD | 5/9/00 | 5/9/00 | AUTO MATIC | | ☑ | FWAD MIN | ☑ | ☐ | |
| 28 ☐ | | 5612 | SD | $4,000.00 USD | $3,200.00 USD | 5/9/00 | 6/23/00 8:30:03PM | AUTO MATIC | | ☑ | SYSTEM | ☑ | ☐ | |
| 29 ☐ | | 3115 | SD | $2,000.00 USD | $1,600.00 USD | 5/9/00 | 5/9/00 | OTHER | | ☑ | FWAD MIN | ☑ | ☐ | |
| 30 ☐ | | 07 | | $65.00 USD | $52.00 USD | 5/9/00 | 5/9/00 | AUTO MATIC | | ☑ | FWAD MIN | ☑ | ☐ | |
| 31 ☐ | | 100 | | $29.00 USD | $23.20 USD | | 6/23/00 4:30:04PM | AUTO MATIC | | ☑ | SYSTEM | ☑ | ☐ | |
| 32 ☐ | | 711 | | $100.00 USD | $80.00 USD | 5/9/00 | 5/9/00 | AUTO MATIC | | ☑ | FWAD MIN | ☑ | ☐ | |
| 33 ☐ | | 3001 | | $75.00 USD | $60.00 USD | | 6/23/00 4:30:04PM | AUTO MATIC | | ☑ | SYSTEM | ☑ | ☐ | |
| 34 ☐ | | 13 | SD | $632.00 USD | $505.60 USD | 5/9/00 | 6/23/00 5:00:06PM | AUTO MATIC | | ☑ | SYSTEM | ☐ | ☐ | |
| | | 1001 | | $120,000.00 USD | $96,000.00 USD | | 5/2/00 | DOCU MENT | | ☐ | FWAD MIN | ☐ | ☑ | AUTOHRIZED BY KENT HALL |

268

*FIG. 36* eREV 2.0

START MENU
QUICK LINKS
- REGION LIST
- BRANCH LIST
- SEARCH

- CLIENT LIST FOR MONROE

FOLLOWUPS

CLIENTS

CUSTOMERS

| ACTION | CLIENT | CONTACT | PHONE | EXTENSION | FOLLOW UP DUE | EMPLOYEE | NOTE | ENTERED |
|---|---|---|---|---|---|---|---|---|
| ☐ | | | | | 5/25/00 | FWADMIN | TRAX 18:17: FWADMIN DONE | 5/25/00 8:48:54AM |
| ○ | | | | | 3/3/00 | FWADMIN | TESTING CONTRACT | 4/18/00 4:05:18PM |

SHOW FOLLOW UPS FOR [▾]   ○ TODAY   ⦿ ALL

☐ ACTIVE EMPLOYEES ONLY

CLIENT
CUSTOMER
INVOICE:

INVOICE NUMBER     1005              INVOICE DATA           2/7/00
PO NUMBER                             ADVANCE CODE          CRR000308A

INVOICE ORIG AMT   $5,000.00 USD     INVOICE ELAPSED DAYS (INVOICE DATE)   107
INVOICE ADV AMT    $5,000.00 USD     INVOICE ELAPSED DAYS (ADVANCE DATE)   77
AMOUNT ADVANCED    $4,000.00 USD

| POST ADJUSTMENT | | POST FULL PAYMENT | | | POST CHARGEBACK | | | POST PARTIAL PAYMENT | | |
|---|---|---|---|---|---|---|---|---|---|---|

| PAYMENTS | | | | SUMMARY | | NOTE | | | INVOICE NOTES | | | OVERRIDE NOTE | | | |
|---|---|---|---|---|---|---|---|---|---|---|---|---|---|---|---|
| POSTED | TYPE | DATE | CHECK NUMBER | ADJUST MENT AMT | PAYMENT AMT | (OVER)/ SHORT | DISCOUNT FEE_REV | INT REV | RECO VERED ADV | REBATE PAYABLE | DISCNT % | COMMI SSION FEE | GUARAN TOR FEE | INSUR ANCE FEE | MINIMUM INVOICE CHARGE |
| ☐ | FULL | 3/8/00 | 12122 | $0.00 USD | $5,000.00 USD | $0.00 USD | $75.00 USD | $0.00 USD | $4,000.00 USD | $925.00 USD | 1.50 | $0.00 USD | $0.00 USD | $0.00 USD | $0.00 USD |

~ 272

CANCEL     OK

PRINT

| CLIENT |
|---|
| CUSTOMER |

INVOICE: 3536

| INVOICE NUMBER | 3536 | INVOICE DATE |
| PO NUMBER | 71153 | ADVANCE CODE |

| INVOICE ORIG AMT | $7,979.34 USD | INVOICE ELAPSED DAYS (INVOICE DATE) |
| INVOICE ADV AMT | $7,979.34 USD | INVOICE ELAPSED DAYS (ADVANCE DATE) |
| AMOUNT ADVANCED | $6,782.44 USD | |

POST ADJUSTMENT    POST FULL PAYMENT    POST CHARGEBACK

| PAYMENTS | SUMMARY | | | | NOTE | | INVOICE NOTES | | | OVER |
|---|---|---|---|---|---|---|---|---|---|---|
| POSTED | TYPE | DATE | CHECK NUMBER | ADJUST AMT | PAYMENT AMT | (OVER) SHORT | DISCOUNT FEE_REV | INTEREST REV | RECOVERED ADV | REBATE PAYABLE | DISCOUNT % |
| NO RECORDS EXIST |

~274

CANCEL

PRINT

*FIG. 39*

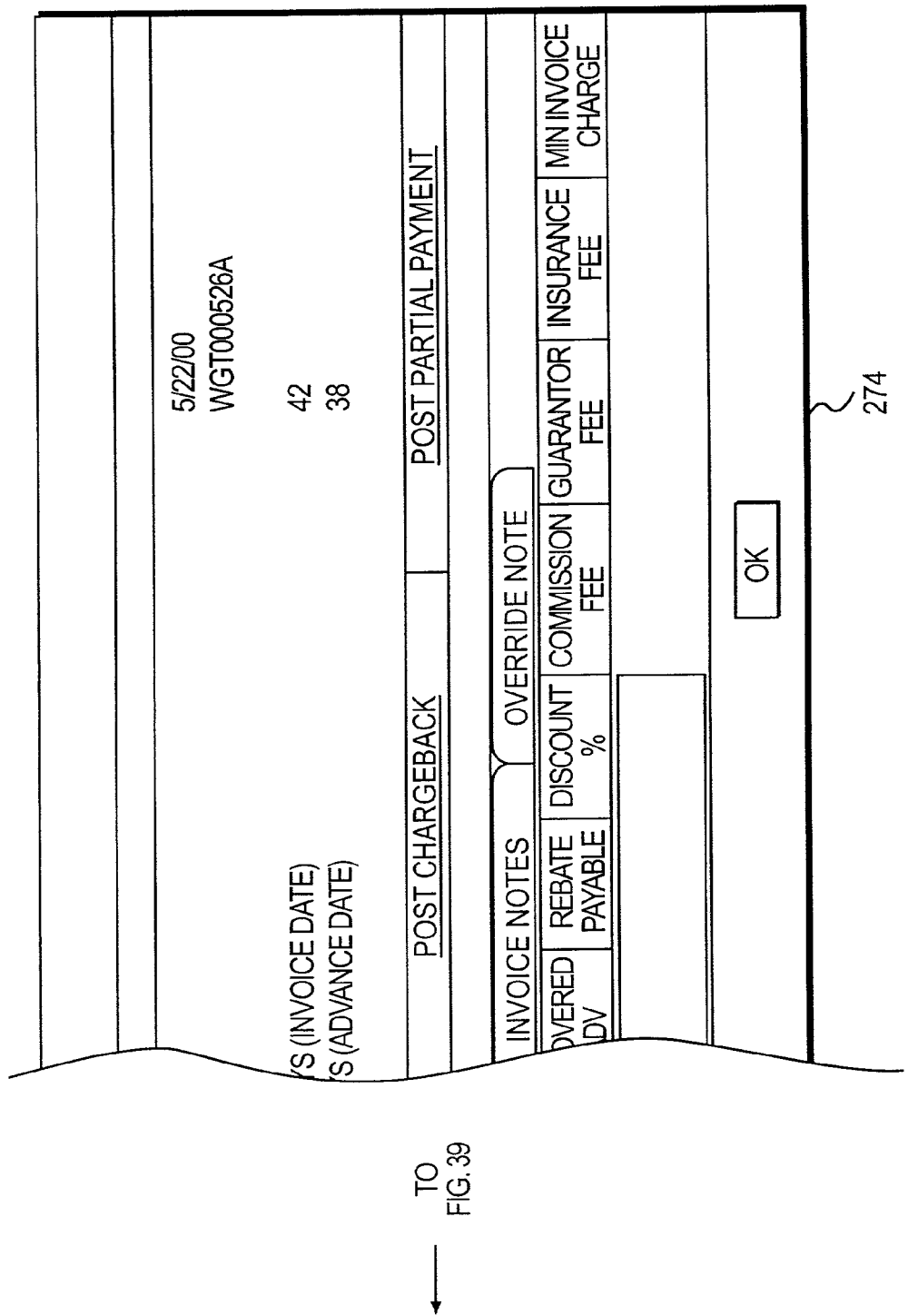
FIG. 39 (CONT-1)

| CHECK NUMBER | 0020 | | CHECK AMOUNT | 10000 | | CHECK BALANCE | $7,416.04 US | | | | SUBMIT & SAVE | |
|---|---|---|---|---|---|---|---|---|---|---|---|---|
| | ADV | INV # | INV BALANCE | INV DATE | ADV DATE | PO# | INV ORG AMT | INV/ADV AMT | ADV AMT | PYMT | PYMT TYPE | PYMT DATE | AMOUNT | ADJUSTMENT/CHARGE | (OVER) SHORT |
| 19 | ☐ | 20606 | $93.65 | 6/12/00 | 6/13/00 | 1463 | $93.65 | $93.66 | $74.92 | ☑ | FULL | 7/10/00 | $93.65 | | $0.00 USD |
| 20 | ☐ | 20612 | $61.28 | 6/13/00 | 6/14/00 | N1464 | $61.28 | $81.28 | $49.02 | ☑ | FULL | 7/10/00 | $61.28 | | $0.00 USD |
| 21 | ☐ | 20637 | $248.02 | 6/14/00 | 6/15/00 | 1466 | $248.02 | $248.02 | $198.42 | ☐ | | | | | |
| 22 | ☐ | 20638 | $111.02 | 6/15/00 | 6/16/00 | 1463 | $111.02 | $111.02 | $88.82 | ☑ | FULL | 7/10/00 | $111.02 | | $0.00 USD |
| 23 | ☐ | 20647 | $200.60 | 6/16/00 | 6/16/00 | 1467 | $200.60 | $200.80 | $160.48 | ☑ | FULL | 7/10/00 | $200.00 | | $0.00 USD |
| 24 | ☐ | 20650 | $2,332.80 | 6/16/00 | 6/19/00 | 1469 | $2,332.80 | $2,332.80 | $1,866.24 | ☐ | | | | | |
| 25 | ☐ | 20656 | $117.41 | 6/19/00 | 6/19/00 | N1454 | $117.41 | $117.41 | $93.93 | ☑ | FULL | 7/10/00 | $117.41 | | $0.00 USD |
| 26 | ☐ | 20655 | $784.55 | 6/19/00 | 6/20/00 | N1463 | $784.55 | $784.55 | $32.42 | ☐ | | | | | |
| 27 | ☐ | 20709 | $40.52 | 6/23/00 | 6/26/00 | N1465 | $40.52 | $40.52 | $169.06 | ☐ | | | | | |
| 28 | ☐ | 20754 | $211.32 | 6/28/00 | 6/29/00 | N1470 | $211.32 | $211.32 | $0.00 | ☑ | | | | | |
| 29 | ◯ | 0708a | $2,000.00 | 7/8/00 | 1/1/1900 | | $1,500.00 | $1,500.00 | $0.00 | ☐ | | | | | |
| 30 | ◯ | 0708b | $1,500.00 | 7/8/00 | 1/1/1900 | | $2,000.00 | $2,000.00 | $0.00 | ☑ | FULL | 7/10/00 | $2,000.00 | | $0.00 USD |
| 31 | ◯ | 0708c | $587.00 | 7/8/00 | 1/1/1900 | | $567.00 | $567.00 | $0.00 | ☐ | | | | | |

RESERVE TRANSACTION LIST
ADD NEW TRANSACTION

| TRANSACTION TYPE | CUSTOMER | PAYMENT DATE | CHECK NUMBER | TRANSACTION AMOUNT |
|---|---|---|---|---|
| ADJUSTMENT | | 4/7/00 | NONE | $1,000.00 |
| UNAPPLIED CASH | | 5/24/00 | 458 | $500.00 |

RESERVE TRANSACTION
NON-FACTORED CASH

ADD RESERVE TRANSACTION

| | |
|---|---|
| RESERVE TRANSACTION | NON-FACTORED CASH ▽ |
| CUSTOMER LIST | ▽ |
| PAYMENT DATE | 5/24/00 |
| CHECK NUMBER | 3342 |
| TRANSACTION AMT | 300.00 |
| GENERAL DESCRIPTION (UP TO 250 CHARACTERS) | CHECK REC'D ON INVOICE NOT FACTORED |

[ UPDATE ]  [ DONE ]

280

FACTORING SYSTEM AND METHOD

This application claims priority to U.S. Provisional Application No. 60/230,010, filed Sep. 5, 2000 the entire disclosure of which is incorporated by reference herein.

BACKGROUND OF THE INVENTION

The present invention relates generally to systems and methods for factoring invoices.

Factoring as a financing method is believed to have existed since ancient times. Generally, it is a method of borrowing against accounts receivable. That is, a business in need of cash approaches a funding source, for example a bank, and offers to exchange its accounts receivable to the funding source in exchange for an agreed-upon percentage of the receivable balance. The funding source, in turn, examines the client's credit worthiness and may investigate the client's customer base. Based on this information, the funding source determines whether or not to factor the client's accounts.

If the funding source agrees to factor the receivables, the client provides information to the funding source describing the group of invoices to be factored. The funding source provides the agreed-upon funds to the client and begins to collect against the invoices. Traditionally, there is little or no analysis of individual invoices prior to making the decision whether or not to factor, particularly in large-scale factoring transactions.

It is known, however, for a small scale funding source to determine whether to enter a factoring arrangement based on an invoice-specific investigation. Generally, these transactions involve clients having a relatively low level of accounts receivable, for example less than $50,000 in any given month. When such clients provide the funding source with a list of invoices to be factored, the funding source manually verifies each invoice by confirming with the client and its customers that each invoice is legitimate and that the goods and services under the invoices have been provided. This is primarily accomplished by verbal or written communication with the client and customers or, where available, by verification from a third party, for example a shipping company, to confirm that goods provided under an invoice have been delivered.

BRIEF DESCRIPTION OF THE DRAWINGS

A full and enabling disclosure of the present invention, including the best mode thereof directed to one of ordinary skill in the art, is set forth in the specification, which makes reference to the appended Figures, in which:

FIGS. 4A, 4B, 4C, 4D and 4E illustrate electronic information-gathering forms for use in an embodiment of the present invention;

FIGS. 9A and 9B are exemplary screen displays for use in an embodiment of the present invention;

FIGS. 10A, 10B and 10C are exemplary screen displays for use in an embodiment of the present invention;

FIG. 17 is an exemplary screen display for use in an embodiment of the present invention;

FIG. 18 is an exemplary screen display for use in an embodiment of the present invention;

FIG. 19 is an exemplary screen display for use in an embodiment of the present invention;

FIG. 22 is an exemplary screen display for use in an embodiment of the present invention;

FIG. 23 is an exemplary screen display for use in an embodiment of the present invention;

FIG. 24 is an exemplary screen display for use in an embodiment of the present invention;

FIG. 25 is an exemplary screen display for use in an embodiment of the present invention;

FIG. 26 is an exemplary screen display for use in an embodiment of the present invention;

FIG. 27 is an exemplary screen display for use in an embodiment of the present invention;

FIG. 28 is an exemplary screen display for use in an embodiment of the present invention;

FIG. 29 is an exemplary screen display for use in an embodiment of the present invention;

FIG. 30 is an exemplary screen display for use in an embodiment of the present invention;

FIG. 31 is an exemplary screen display for use in an embodiment of the present invention;

FIG. 32 is an exemplary screen display for use in an embodiment of the present invention;

FIG. 33 is an exemplary screen display for use in an embodiment of the present invention;

FIG. 34 is an exemplary screen display for use in an embodiment of the present invention;

FIGS. 35A, 35B and 35C are exemplary screen displays for use in an embodiment of the present invention;

FIG. 36 is an exemplary screen display for use in an embodiment of the present invention;

FIG. 37 is an exemplary screen display for use in an embodiment of the present invention;

FIG. 38 is an exemplary screen display for use in an embodiment of the present invention;

FIG. 39 is an exemplary screen display for use in an embodiment of the present invention;

FIG. 40 is an exemplary screen display for use in an embodiment of the present invention;

FIGS. 41A and 41B are exemplary screen displays for use in an embodiment of the present invention;

Figure 1:
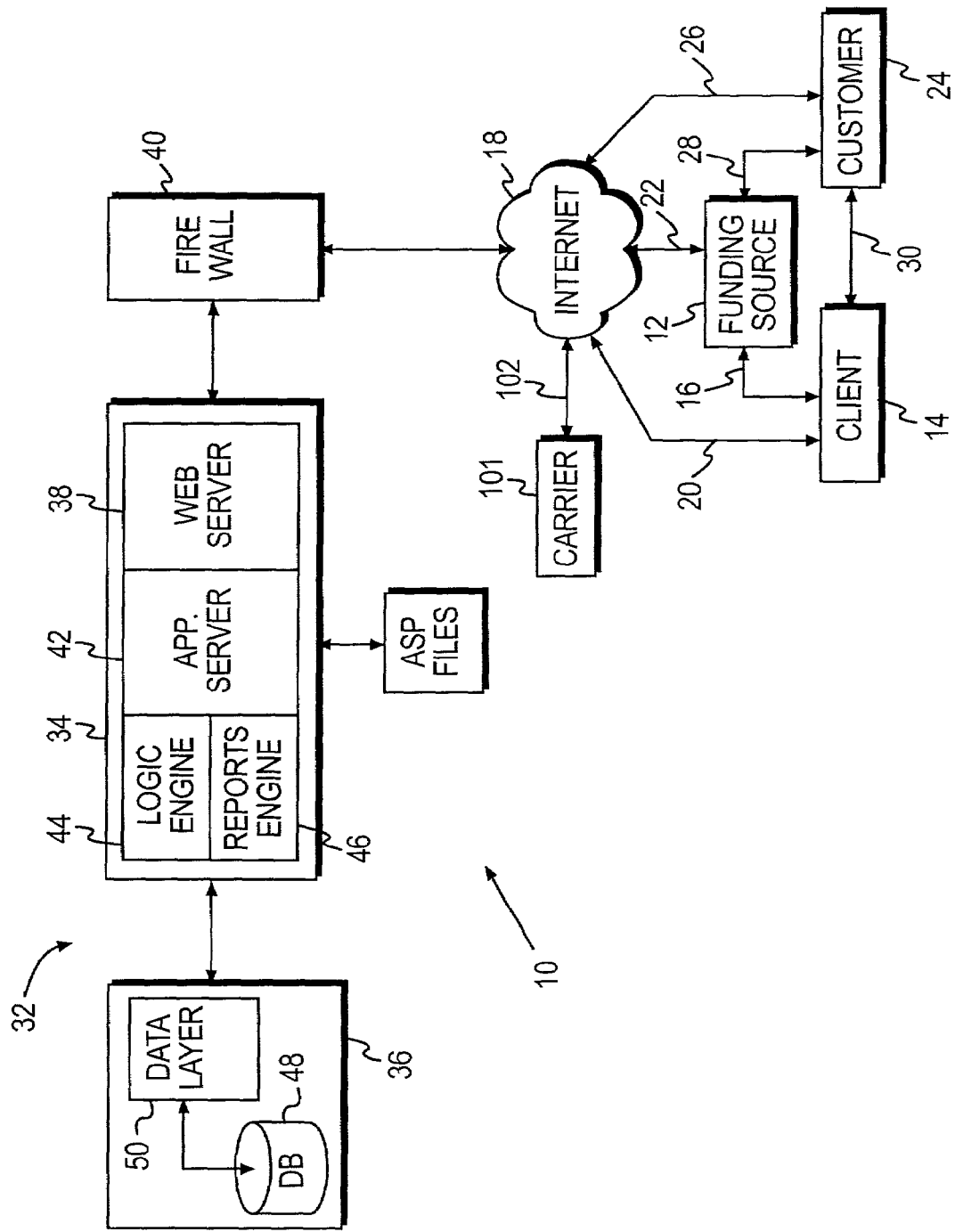
FIG. 1 is a diagrammatic view of a factoring system according to an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

One or more of the preferred embodiments of the present invention described below operate within a distributed computing environment, although it should be understood that the present invention may be utilized in a stand-alone computing environment as well. Those of ordinary skill in this art should understand that the embodiments described below are provided for purposes of example only and that the present invention may be embodied in various suitable environments.

Generally, a distributed computing environment includes multiple memory storage and computing devices located remotely from each other. Execution of program modules may occur at these remote locations as data is transferred among the memory devices and by and between the computing devices over an extended network. Examples of distributed computing systems include the Internet and local area networks. The Internet is a global accumulation of computing devices that communicate through an information retrieval system, most commonly the World Wide Web (hereinafter "Web").

Certain operations and processes described herein are executed by one or more computers within a distributed computing network or as stand-alone devices. As should be well understood, a computer transforms information in the form of electronic signals input into the computer to a desired output. The input may be provided by a human operator, another computer, or from other external stimuli. To accomplish these functions in one computing environment, a conventional personal computer includes a processor, read-only and random-access memory, a bus system and an input-output system to transfer information within the personal computer and to interact with external devices. The computer's memory includes an operating system and various application programs that run on the operating system. Application programs may be added to memory from external devices, for example through the Internet, and may be run on the operating system from an external device or from a device hosted by the computer, for example a disk drive or a CD ROM drive.

The computer's memory may include an application program for browsing the World Wide Web. The browser, which may reside on a server in a local area network or in a stand-alone computer, establishes communications between a Web server and the computer. In response to receipt of a Uniform Resource Locator ("URL"), the browser establishes a network path to a Web server identified by the URL. Once connected, the computer and the Web server may communicate with each other using the Hypertext Transfer Protocol ("HTTP"). For example, the Web server may transfer Web pages, including text and graphic images, and sound and video files using a standard description language such as hypertext markup language ("HTML"). The Web page, using HTML, may provide "links" to other files and to other servers. The links may be provided as options to the user so that the user may choose to execute the link, or an application program operated by the computer user may execute the link without the user's knowledge. The application program may be hosted by the Web server or by a network driven by the Web server and operated by the user over the Internet through the Web browser. The Web server in such an environment is located at an application service provider ("ASP"), an arrangement that should be well understood by those skilled in this art.

It should be understood that the present invention is not limited to the HTML model. For example, the Web server may dynamically produce Web pages by script execution or may transmit scripts or other programs for execution by the Web browser.

A. System Overview

As described above, the present invention relates to factoring transactions. Generally, the transaction involves four entities: a customer, a client, a funding source, and a factoring administrator. The funding source can be any entity, for example a bank, trade organization, credit union or private factoring company, that advances to a client funds that are secured by the client's accounts receivable. The funding source and the client agree to fees and interest that are to be paid to the funding source based on the advance amount and other parameters relating to invoices between the client and its customers. One such parameter is the "advance rate," i.e. the percentage of the invoice amount or some portion of the invoice amount that the funding source will advance to the client. For example, if the client and funding source agree to an 80% advance rate, the funding source advances $800 to the client for a $1,000 invoice owing from a customer to the client.

The client also pays a discount fee and interest to the funding source based on the period of time between the date on which the funding source advances funds and the date on which the customer ultimately pays the invoice. The discount rate may be flat or staggered. For example, the client and funding source may agree to discount rates that increase at ten-day intervals between the advance date and a date upon which the invoice is deemed to be nonrecoverable, hereinafter referred to as the "charge back" date. Assume, for example, that the charge back date for a group of invoices for a given client is 50 days. The parties may agree that the discount rate is 1% if the customer pays the invoice within ten days of the advance date and that the discount rate increases 0.25% for each ten-day period thereafter. The interest rate is agreed to by the parties and may be a function of an agreed-upon rate. For example, the parties may agree that the interest rate is prime plus 2%.

If the invoice is unpaid as of the charge back date, the client owes discount and interest payments calculated as of the charge back date. Whether the client also repays the advance depends on the original agreement between the client and the funding source. Larger funding sources typically engage in "recourse" factoring and require repayment of the advance in full. It is not uncommon, however, for the funding source to assume this risk. In such "non-recourse" factoring, the advance, discount and interest rates typically reflect the added risk to the funding source.

As an example, assume again that a funding source has agreed to factor a $1,000 invoice for a client based on an 80% advance rate at the discount rate schedule described above. If the funding source advances $800 on February 1, and the customer pays the invoice in full to the funding source on March 30, forty-five days from the advance date, the discount rate is 2%. Thus, the discount fee on the $1,000 invoice is $20. Assume that the interest on this period is 0.4%, or $4.00. Accordingly, the funding source deducts the $800 advance, the $20 discount fee and the $4.00 interest from the $1,000 payment and forwards a $176.00 rebate to the client.

Funding sources may charge a variety of fees, for example transaction fees, commissions, minimum invoice charges, insurance fees, guarantee fees, processing fees, administrative fees, wire fees, commitment fees, setup fees, borrowing base charges, and broker split fees, as agreed to by the parties. All such fees may be defined and managed within the factoring administrator.

The factoring administrator facilitates these transactions, in particular but not necessarily where the transactions are invoice-specific, by collecting, managing and transferring information among the other three entities. In certain preferred environments, the factoring administrator is embodied by or works through the funding source so that the administrator is transparent to the client. FIG. 1 illustrates one preferred arrangement 10 of the present invention in which the factoring administrator interacts with funding sources and clients through the Internet. Within system 10, funding sources 12 can communicate with clients 14 through the Internet 18, as indicated at 20 and 22, or through a variety of communication channels indicated at 16, for example through verbal, paper, telephone or intranet communication. Similarly, funding sources 12 and customers 24 may communicate with each other through the Internet, as indicated at 22 and 26, or may communicate through other means as indicated at 28. Clients 14 and their customers 24 may communicate through the Internet or through other means, as indicated at 30.

When a client 14 requests that a funding source factor one or more of its invoices, the funding source requires information about the client, its customers and the invoices. Where the communication between the client and the funding source is electronically interactive, the funding source may link the client through Internet 18 to a factoring administrator 32 housed at an ASP application server system 34 and data server 36. The client may also link to the factoring administrator directly though its Web site or through a portal Web site as discussed below. ASP server system 34 includes a Web server 38 that establishes and manages communications between system 34 and external entities and includes a plurality of application servers 42, one of which houses and executes a logic engine 44 and a reports engine 46. Both engines are computer programs written in a suitable language, for example SQL 7.0. Each engine generates HTML Web pages that Web server 38 transfers through Internet 18 to a receiving entity and through which the receiving entity communicates with the engines.

Logic engine 44 collects information from funding sources 12 and clients 14 and performs multiple operations with the data. For example, it automatically updates currency rates and accrues interest and other fees on a periodic basis. It also performs accounting functions, reconciling on a daily basis all advances made to clients and all payments received from customers for a general ledger report. Every thirty minutes, the engine surveys third party databases to determine the delivery status of invoices in the system.

Logic engine 44 stores data in an SQL database 48 at data server 36 through a data management program 50. As discussed in more detail below, funding sources 12 and clients 14 have certain access to database 48 through logic engine 44 and reports engine 46.

Figure 2:
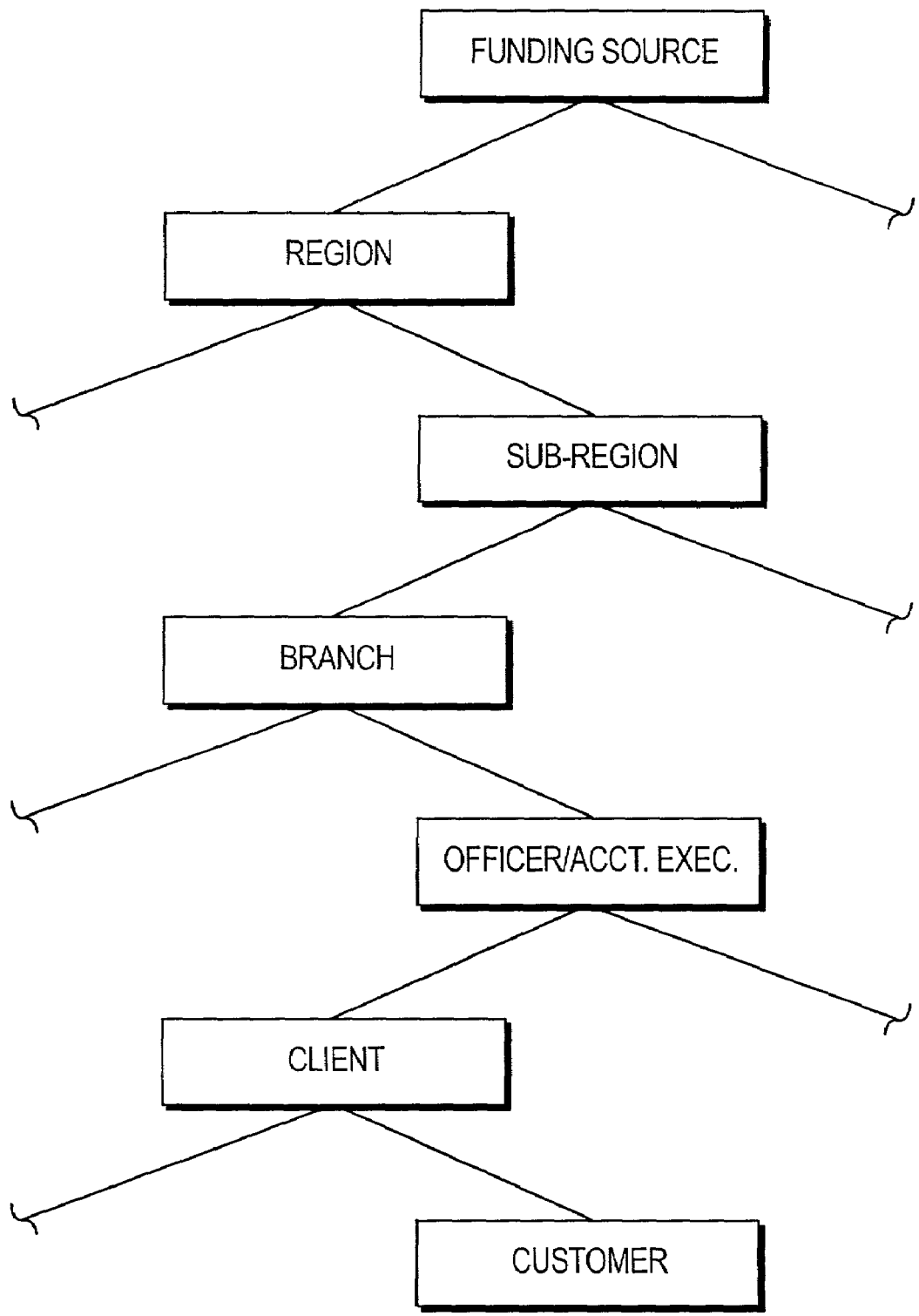
FIG. 2 is a diagram of a data hierarchy for use in an embodiment of the present invention.

Referring to FIG. 2, funding sources reside at the top of a data file hierarchy by which database 48 is defined. For each funding source file, a file exists for each region served by that funding source. Regions may be defined in any suitable manner but are typically geographic. Each region is defined by one or more sub-regions, which are in turn divided into one or more branch offices. Each branch includes one or more officers or account executives. Clients are defined for each officer, and customers are defined for each client. Since clients may go to multiple funding sources to factor their invoices, and since customers may deal with multiple clients, multiple files may exist for any given client and any given customer in the database file repository.

Figure 3:
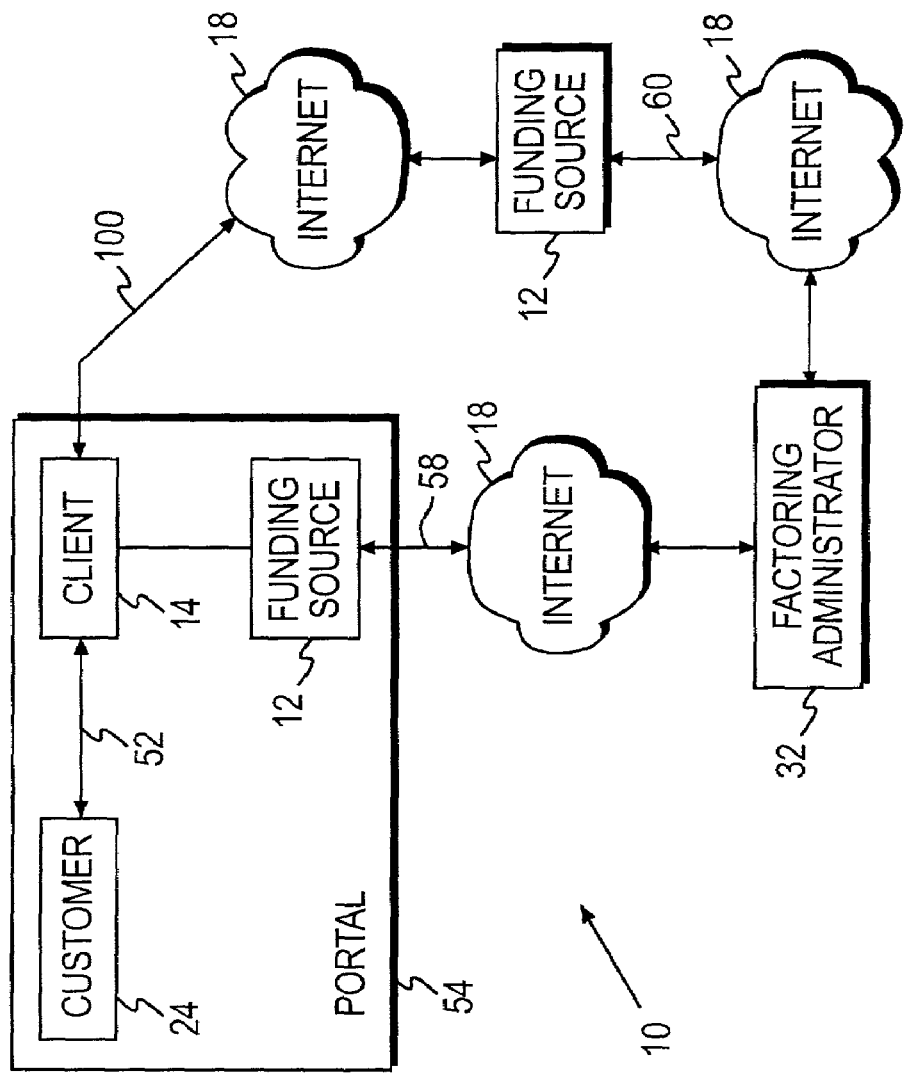
FIG. 3 is a diagrammatic view of a factoring system according to an embodiment of the present invention.

FIG. 3 diagrams an exemplary factoring transaction utilizing the system described in FIG. 1 in which a commercial transaction 52 is executed between client 14 and customer 24 through an Internet portal 54. As should be well understood in this art, a portal is a Web site that provides access to providers of goods and services over the Internet. Typically, the providers pay fees for advertising they place on the portal site and may also pay a percentage on transactions executed through the portal. There are a variety of portals, some of which are geared to specific markets. A client 14 may advertise and establish links on one or more portals, depending on where its customers and potential customers are likely to be. Depending on the portal, customers may be able to freely access the portal or may be required to register with the portal before making transactions.

In a preferred embodiment, client 14 provides predefined information to portal 54 when it registers with the portal. The client may provide this information electronically in an on-line application form provided by the portal, for example as shown in FIGS. 4A-4E. The form is defined by the factoring administrator to capture information desired by the funding sources in determining whether to accept or deny client credit applications.

The electronic application form is provided through a portal Web page so that the client may click on the various information slots to enter appropriate data. As shown in FIG. 4A, several information slots are filled by pull-down options. For example, U.S. states and provinces may be listed in a table from which the client may choose the appropriate entry. Under "Form of Business Structures," the client may identify whether it is a corporation, partnership, individual or "other." Similarly, the application includes a pull-down list of pre-defined sectors/industries. Selection of this information triggers a second pull-down list of standard industry codes (SIC) that apply to the chosen sector or industry. The predefinition of options permits the funding source and/or the funding administrator to define how the registration information is presented to the client, thereby facilitating the client's later application to the funding source.

The client may choose among predetermined ranges for gross sales, accounts payable, net worth and type of current management structure. For example, the gross sales ranges may be (1) less than $500,000, (2) $500,000 to $5,000,000, (3) $5,000,000 to $10,000,000, and (4) greater than $10,000,000. Accounts payable may be (1) current, (2) 30-59 days, (3) 60-90 days and (4) greater than 91 days. Net worth may range among (1) less than $150,000, (2) $150,000 to $1,000,000, (3) $1,000,000 to $10,000,000 and (4) greater than $10,000,000. The business management choices may be (1) less than one year (2) 1-4 years, (3) 4-10 years, and (4) greater than 10 years. Regarding past liens or judgments, the client may choose among (1) none, (2) past/paid, (3) small/open, and (4) large/open. It should be understood that the information shown in FIG. 4A is provided for purposes of example only.

Once the client has input information about itself and clicked the "Next" button, the electronic application queries the client to enter information concerning up to ten of its largest customers, as shown in FIG. 4B. Upon clicking the "Add Customer" button, the application presents the client with a data screen as shown in FIG. 4C. Again, certain information is entered through a choice of ranges provided in the pull-down boxes. For example, the client may specify that it has dealt with the customer (1) less than one year, (2) 1-4 years, (3) 4-10 years, or (4) greater than 10 years. The client may specify that the percentage of its sales with this customer is (1) less than 10%, (2) 11%-24%, (3) 25%-49%, or (4) greater than 50%.

Once the client has entered information regarding its customers, it clicks the "Next" button shown in FIG. 4B to move to a principals screen shown in FIG. 4D. Upon clicking an "Add Owner" icon, the logic engine presents the client with a screen shown in FIG. 4E, through which the client may add owner information. Once the client has entered information regarding its owners, it clicks the "Next" button shown in FIG. 4D to complete, or move to the next stage in, portal registration. The information is stored in a database maintained by the portal.

Referring again to FIG. 3, a customer 24 may visit the portal Web site and initiate a transaction 52 with client 14. Before or during the transaction, the portal or the client requires the customer to electronically provide identification information shown in the first twelve fields of the screen shown in FIG. 4C. At execution, the portal assigns a unique identification code to the transaction.

As a result of transaction 52, client 14 has provided goods and/or services to customer 24 and now maintains an invoice for the payment owed to it by the customer. Where the transaction occurs electronically, as shown in FIG. 3, client 14 generally supports a software system that manages the transaction and that collects and stores information relating to the invoice. The invoice data may be stored in a variety of formats, for example as an ANSI ASC X12 invoice in Electronic Data Interchange (EDI) format. At this point, this information is stored and managed by client 14.

The portal maintains predetermined invoice information about each transaction 52 at its database in a format defined by the factoring administrator. In one exemplary embodiment, data fields are provided for each invoice to identify the client 14, the client contact individual, the customer 24, the customer contact person, the address to which payment should be made, the invoice number and/or the purchase order number, invoice date, vendor number (if applicable), currency in which the invoice is requested, customer and store numbers (if applicable), the name and address of the individual to whom the invoice should be addressed, the name and address of the individual to whom goods are to be shipped, the name of the carrier of the goods, the tracking number assigned to the goods by the carrier, the invoice due date, rate, shipment date, freight amount, method of payment, whether freight is included in the invoice total, and identification of goods shipped. The identification of goods includes an identification number, description, quantity, unit price and taxes.

The portal may assign the purchase order number or the invoice number. The customer may assign a vendor number to the client, and the client may assign a customer number to the customer. Where the client has multiple stores, the store number may identify the particular store from which the goods were shipped.

Figure 5:
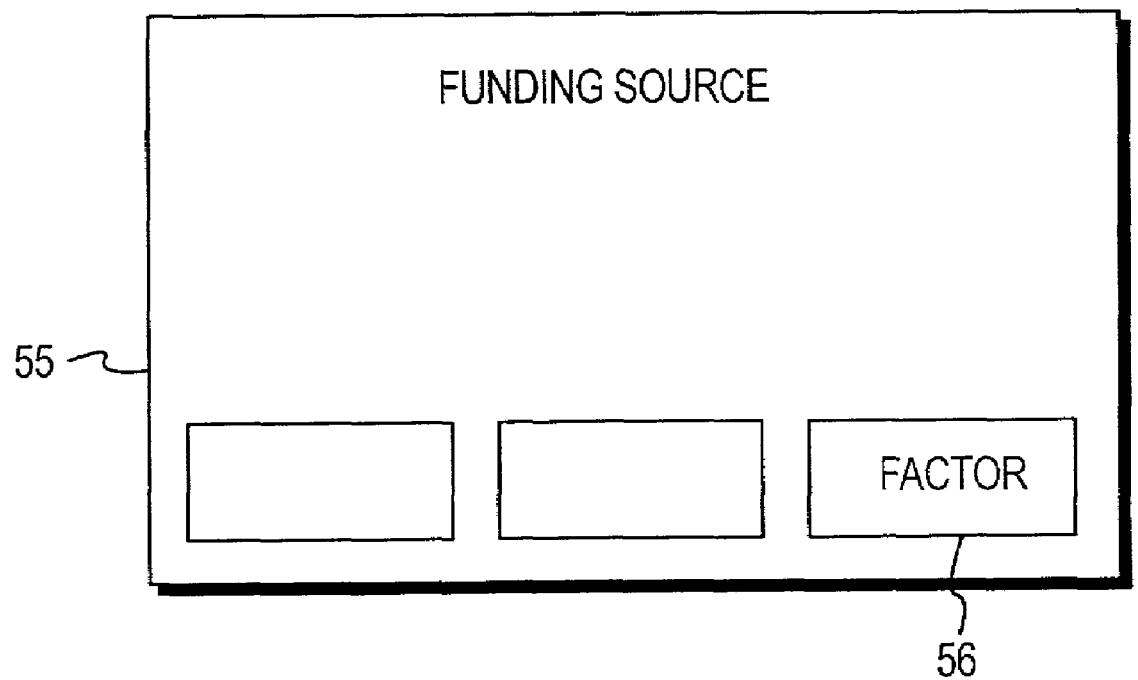
FIG. 5 is an exemplary web page including a factoring service icon.

Clients may access factoring services at the portal directly though a funding source 12 or through the factoring administrator. When client 14 chooses to factor one or more of its invoices, it may go to the portal Web site, select a funding source 12 and click a link to that funding source provided on the portal Web site. The client is then presented with a Web page 55, as shown in FIG. 5, that identifies and describes the funding source and its services and that includes one or more links or icons that permit the client to conduct business with the funding source. One of these icons, indicated at 56, triggers the funding source's factoring service and links the client to factoring administrator 32 (FIG. 1), as indicated at 58 in FIG. 3. Alternatively, where the client has not chosen a funding source, it may directly access the factoring administrator through portal 54 by a link maintained at the portal site. In either case, and referring also to FIG. 1, logic server 44 causes Web server 38 to transmit a Web page to client 14 that presents an application form as shown in FIGS. 4A-4E. If the client has registered with the portal, the engine populates the application's data fields with the client's portal registration data when the client enters its portal ID number. The client submits its request by activating an "I Agree" button, and the engine provides the client a tracking number identifying its request.

Server 38 also requests the identification numbers assigned by the portal identifying the one or more transactions 52 that the client wishes to factor. When the client provides the portal numbers, the engine populates an invoice request form for each invoice with the invoice information described above. If the client is requesting factoring services directly from the funding source, the invoice requests are made available to the funding source for decision. If the client is requesting factoring services through the factoring administrator through its portal link, the factoring administrator passes the invoice requests to a funding source upon selecting the funding source as set forth below. The procedure by which the funding source thereafter selects invoices for advance is discussed below.

Where the client has accessed the factoring administrator directly, the factoring administrator assigns the client to a funding source according to criteria defined by the funding sources. Such criteria might include the client's geographic location, its business sector/industry, its net worth and/or any other information provided through the application form shown in FIGS. 4A-4E. That is, each funding source provides the factoring administrator with qualities it requires, desires or would accept of its clients. Responsively to the information provided by the client on the form, the factoring administrator examines the client information with respect to the funding source criteria and assigns the client to the funding source corresponding to the closest fit.

To assign one or more clients, a factoring administrator operator searches database 48 though logic engine 44 (FIG. 1) for client applications submitted over a certain period. The engine presents a screen at which the operator defines the period's start and end dates and, optionally, the status of applications it wishes to search. For example, the operator may search those applications that are complete (i.e. all required information is provided) but not yet assigned to a funding source, that are incomplete, that have been declined by one or more funding sources, that have been assigned to a funding source, that have been accepted by a funding source, that have been rejected by all funding sources or that have been summarily rejected by the factoring administrator. The last condition may occur, for example, where the funding source criteria includes conditions under which no client will be accepted and the client fails one or more such conditions for all funding sources.

When the operator selects "complete" applications, the engine presents a screen that lists all such applications received from clients during the specified period. For each application, the screen provides the application's tracking number, it client name, its status and the funding source to which it has been assigned (for "complete" applications, the last field is blank). By clicking on the name of a desired application, the operator is presented with the client's application information as described above with respect to FIGS. 4A-4E. The operator may complete, delete or change any information in the data fields. An "Update/Next" button allows the operator to save the updated application form to the database and move to the next application in the list.

Figure 42:
FIG. 42 is an exemplary screen display for use in an embodiment of the present invention.

Activation of an "Update Status" button presents a screen 57, shown in FIG. 42, though which the operator may select a funding source. Pull-down boxes list the funding sources in database 48 (FIG. 1) and the application status levels described above. Upon deciding on a funding source, the operator chooses the funding source from the pull-down box, changes the application's status to "assigned" and activates an "Update" button.

Prior to the assignment, however, the operator may apply a scoring algorithm to the client. The scoring algorithm is specific to each funding source. To score a client using a particular funding source's algorithm, the operator selects the funding source in the pull-down box and activates a "Scoring" button. The scoring procedure, which is described below, provides a credit worthiness score that the funding source may include in the acceptance criteria it provides to the funding source.

In another preferred embodiment, the operator may leave the funding source pull-down box blank. Upon activation of a "Select" button (not shown), the engine applies a best fit routine to the client information against the funding source criteria to select the funding source. The operator may accept or change the automatic selection and activate the "Update" button.

Activation of the "Update" button in screen 57 presents the operator with a screen that lists the client and each of the customers entered in the client's application. Beside the client name is a pull-down box that lists each client for which a file exists in database 48. The box also provides "Add to Repository" and "Do Not Associate with Repository" options. If the client already has a file in database 48, the operator chooses the appropriate entry in the box. If the client is new, or if the operator wishes to replace the client's existing information, the operator selects the "Add to Repository" option. If the operator does not wish to add the client's information in database 48, it chooses the "Do Not Associate with Repository" option.

A similar pull-down box is provided for each customer. Thus, the operator may select existing customer information or may add the customer as a file under the client in the hierarchy shown in FIG. 2.

The factoring administrator submits the client application to the funding source for approval by activating a "Continue" button. If the client was an existing client previously accepted by the funding source, the engine may forward the invoice request without the client application. That is, the engine submits the invoices for which the client requests an advance for consideration by the funding source without first requiring that the funding source accept the client. The process by which funds are advanced on invoices is described further below.

If the client is new to the funding source, its application is made available in database 48 to the funding source for acceptance or denial. Upon accessing factoring administration system 32 though Internet 18 and passing a logon procedure, the funding source may select a credit application search option from an options menu to search for client applications submitted over a certain period. The search is similar to the factoring administrator's search described above. The logic engine presents a screen at which the funding source defines the period's start date and end date and the status of applications it wishes to search. The funding source may choose to search for applications assigned to it but not accepted or declined, for accepted applications or for declined applications.

Figure 43:
FIG. 43 is an exemplary screen display for use in an embodiment of the present invention.

Upon choosing "assigned" applications and activating a "View" button, the funding source is presented with a screen that lists all pending client applications submitted during the defined period. The screen displays each application's tracking number, client name and status. By clicking on the client's name, the funding source is presented with a screen that displays the client application information. The funding source may change information in the data fields if necessary and activate an "Update/Next" button to move to the next application in the list or an "Update Status" button to move to a screen 59 as shown in FIG. 43. Screen 59 lists the client's name, a number that identifies the place in which the application falls in the sequence of applications received by the funding source since a predefined start date, the application's tracking number and its current status. The funding source may assign a code to a client from a plurality of codes defined by the funding source and may assign the client to a region, sub-region and branch. Pull-down boxes are provided so that the funding source may choose from among the regions, sub-regions and branches defined for the funding source in the data hierarchy described in FIG. 2. A "Client Status" box indicates whether the client is an active client or a new client.

The funding source may at this time accept or deny the client's application by choosing the appropriate option in a pull-down box at the status line at screen 59 and activating the "Update" button. Prior to making this choice, however, the funding source may score the client, as described below, by activating a "Scoring" button.

When the client requests factoring services directly from the funding source through the funding source's portal link, assignment by the factoring administrator is unnecessary, and the application's status is automatically set to "assigned." In this situation, logic engine 44 searches database 48 and determines whether the funding source's files include the client. If so, engine 44 identifies the client as active and may update the client file information if there are changes. If there is no client file, the engine creates a file, populates the file with the information received from the portal, and identifies the client as a new client. The engine also checks database 48 to determine whether the funding source's files include files for the invoice customers. If a customer is not present, the engine identifies the customer as a new customer when it reports the factoring request to the funding source. It also searches for the customer in the repository of all customers in database 48, including customers of other clients. If information exists for the customer in the repository, the engine makes certain repository information available to the funding source as descried below.

Referring to FIGS. 1 and 3, engine 44 updates database 48 with the client, customer and invoice information provided by the portal and makes the client application and advance request available to the funding source in database 48 as described above and indicated at 60. The funding source accepts or declines the client in the same manner discussed above with respect to FIG. 43. The decision regarding advancement is discussed below.

Figure 6:
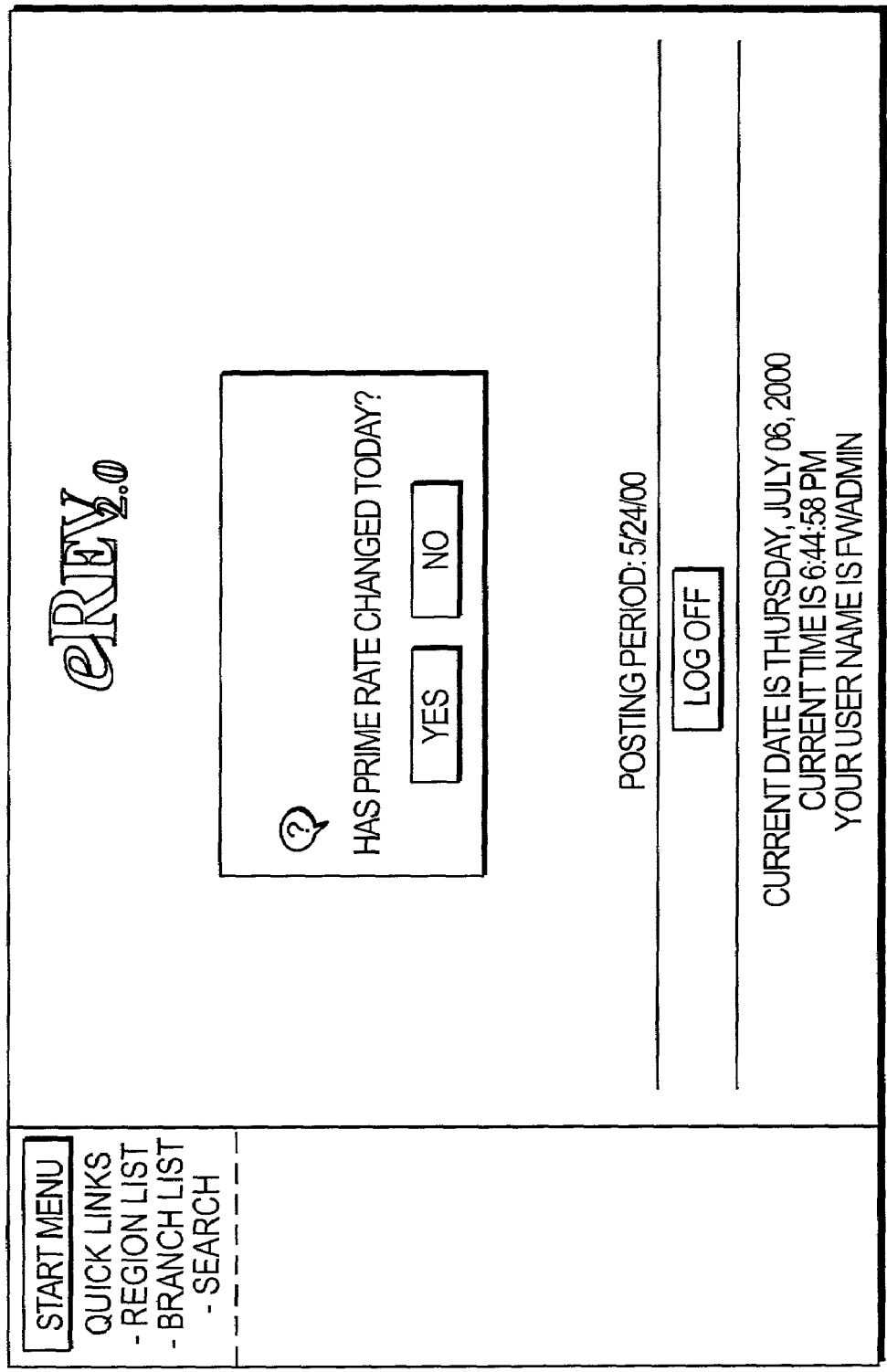
FIG. 6 is an exemplary screen display for use in an embodiment of the present invention.
Figure 7:
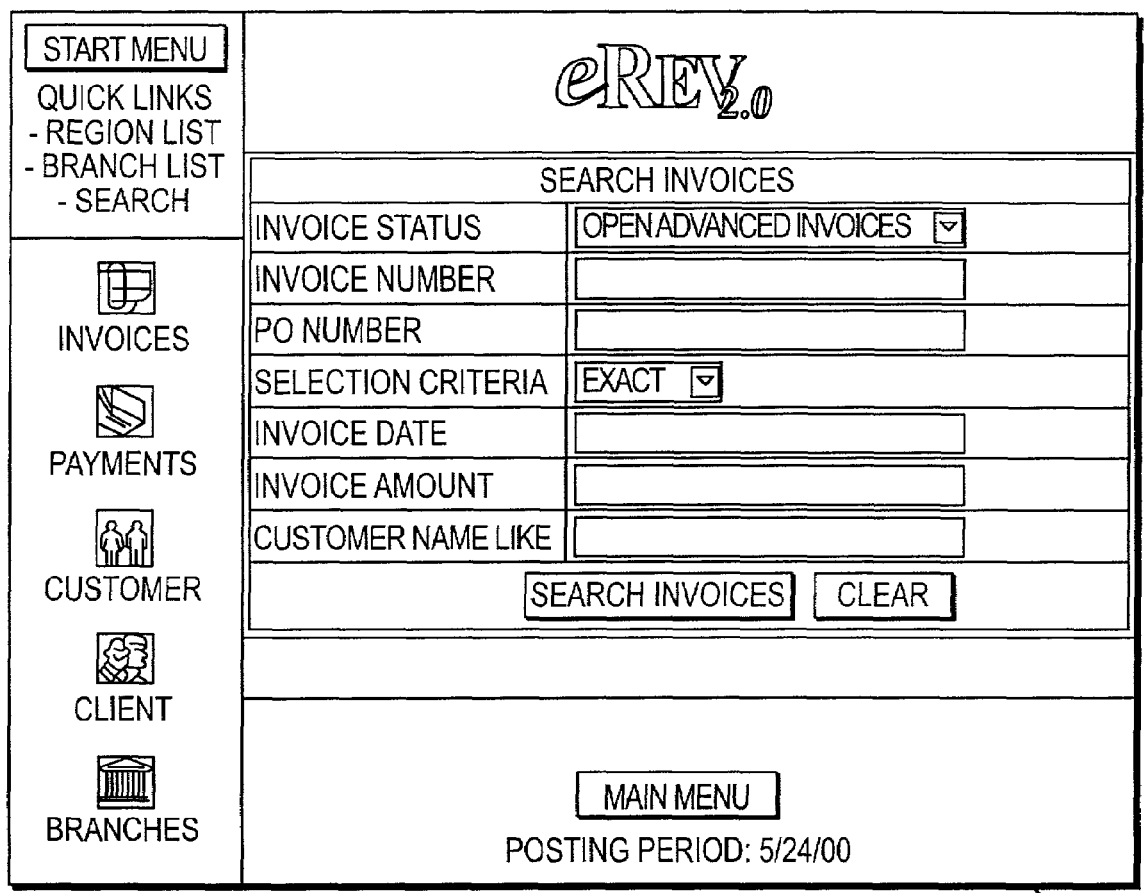
FIG. 7 is an exemplary screen display for use in an embodiment of the present invention.

In general, funding source 12 may access client information using logic engine 44 and reports engine 46. After executing a login procedure that permits the funding source access to the data files, engine 44 presents a screen 62 to the funding source, as shown in FIG. 6. By clicking "Search" in the upper left-hand corner, the funding source is presented with a screen 64 as shown in FIG. 7. The icons at the screen's left-hand side provide the option of searching for invoices, payments, customers, clients or branches. As shown in FIG. 7, the default search is for invoices.

Figure 8:
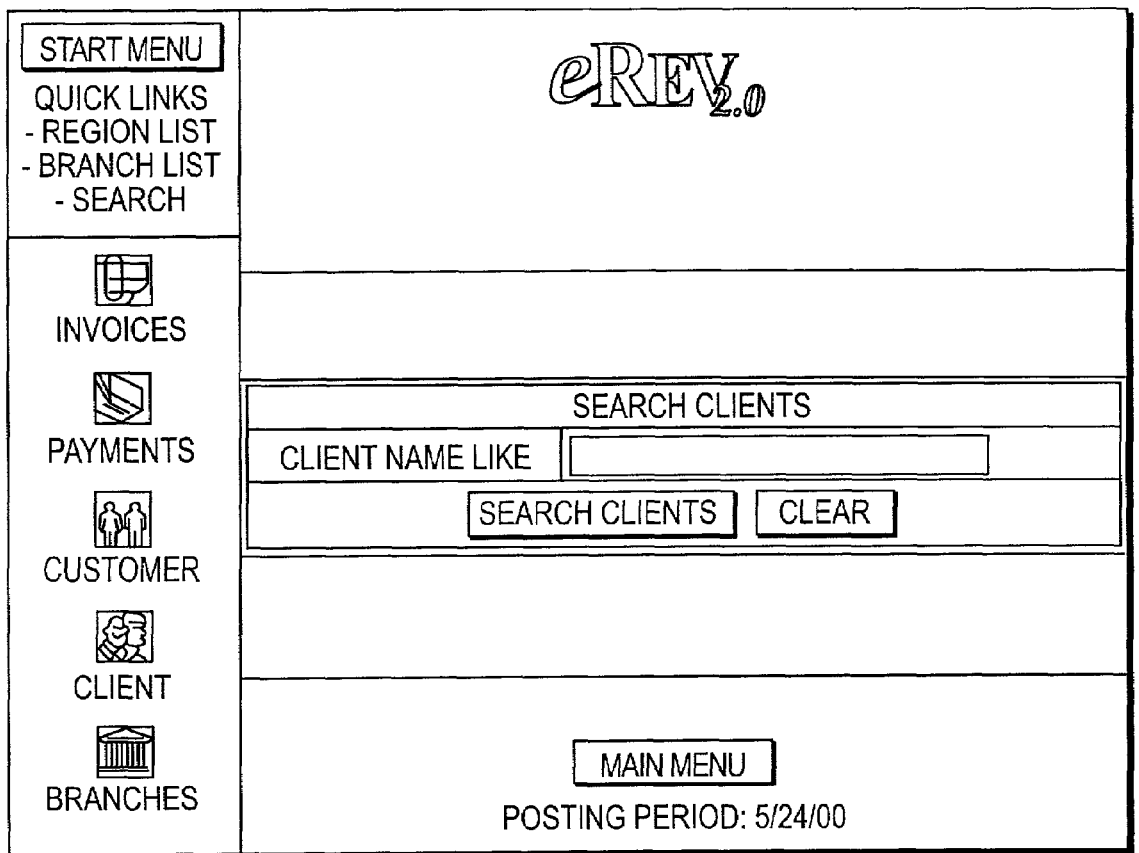
FIG. 8 is an exemplary screen display for use in an embodiment of the present invention.

If the funding source activates the "Client" icon of screen 64, the logic engine presents a screen 66 as shown in FIG. 8. When the funding source enters and executes a search query, the engine displays a page listing all clients that meet the query requirements. Upon selecting a client, the engine presents a screen 68, as shown in FIG. 9A, that lists general information about the client in data fields populated by client data stored in database 48 (FIG. 1). As noted above where the client is new to the funding source, this information was provided to the portal when the client registered with the portal. Not all the data fields shown in screen 68 may necessarily be complete. The funding source may choose to proceed without missing information or to contact the client for any additional information as needed. In any event, the funding source may update any of the client information through this screen.

Screen 68 displays general information about the client. It is the default client screen but can be selected from other search screens by activating the "Client General" icon at the left-hand side of screen 68 at any time following selection of a client. Activation of the other icons provides information regarding client locations, client officers and other principals, professionals (e.g., accountants, attorneys, insurance agents and landlords) that service the client, banking information (e.g., business checking, personal checking and loan references), background information (e.g., funding, tax and referral information), specific procedures that should be followed for the client, notes regarding any transactions with the client, and a broker list. Appendix 1 attached hereto describes data fields for exemplary screens for capturing this information.

Figure 9B:
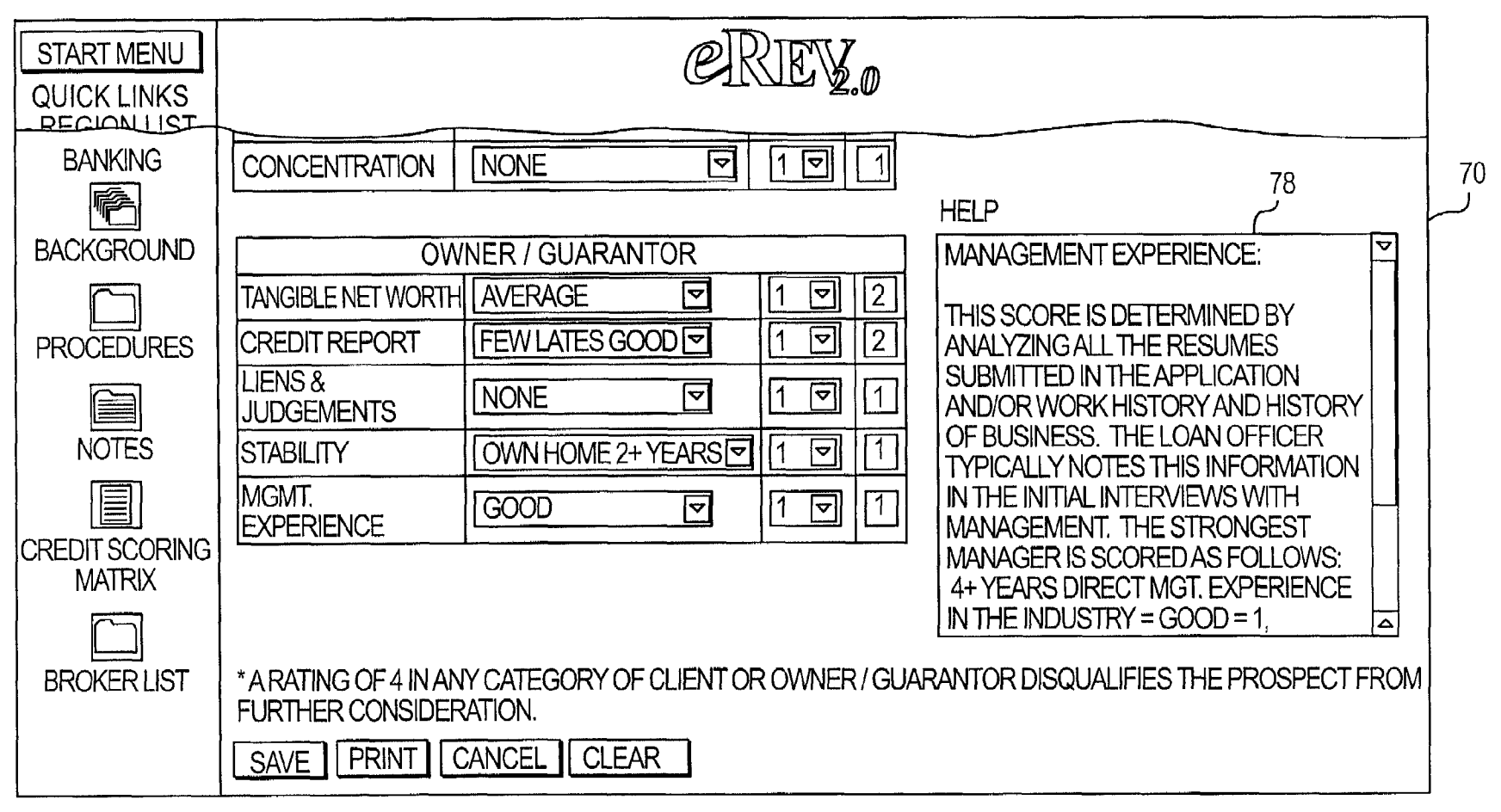

FIG. 9B illustrates a screen 70 presented to the funding source when the funding source selects the "Credit Scoring Matrix" icon or the "Scoring" button in screen 59 (FIG. 43). Screen 70 is driven by an algorithm predefined by the funding source and programmed into engine 44 for that funding source. The algorithm produces a score for the client that the funding source uses to determine the client's credit worthiness and is entirely at the discretion of the funding source, by agreement with the factoring administrator. Thus, the example provided in FIG. 9B is for purposes of illustration only.

Screen 70 includes input data fields 72 populated by information entered by the funding source in response to the client's portal registration information. The funding source may update the entries over time. Each field 72 is an algorithm input selected by the funding source from among predetermined options in a pull-down box. The set of options in each pull-down box therefore describes a set of possible values for the corresponding algorithm input. A respective score value is associated with each option in each box 72. A help box 78 provides a description of each option and its corresponding score value.

Each data field 72 is related to an input score box 74 by a weighting box 76. The funding source selects the weighting from a predefined group of values in a pull-down box. Engine 44 multiplies the score value associated with the selection from box 72 by the weighting in box 76, or otherwise manipulates the selected score value responsively to the weighting in the corresponding box 76 according to an equation defined by the funding source and implemented in engine 44 by the factoring administrator.

Data fields 72 are organized into three groups based on the nature of their information as follows: client, customer, and owner/guarantor. A totals box 80 provides a score 81 for each group. The group score is based on the individual input scores 74 within the group. Equations defined by the funding source and implemented into engine 44 (FIG. 1) by the factoring administrator define relationships between the input scores 74 and group scores 81 and between the group scores and the group total. Help box 78 may also list these equations. Any group score 81 of four or higher in the illustrated example disqualifies the client. The funding source may, however, override a disqualification by deactivating a checkbox adjacent to the group score greater than four. If the average group score is lower than four, the client is approved for factoring services according to the algorithm, as indicated by an approval box 87.

A grand total 83, in this case the sum of the three group scores, is the client's credit score. A scoring legend box 85 defines the criteria against which the credit source is measured to determine the client's credit limit. In the illustrated example, a credit score of five or less approves the client for a credit limit greater than $500,000. The credit limit is capped at $500,000 for a score of six and at $200,000 for a score of seven or higher.

Once the client's credit worthiness and credit limit have been established, the funding source may approve the client as described above and may then choose to factor the client's invoices. Returning to FIG. 9A, when the funding source operator selects the client that has requested invoice factoring, it selects the "Funding" button from the menu at the screen's left-hand side. The logic engine presents a screen 82, as shown in FIG. 10A, that describes all factoring advances that have been made to the client. By clicking the "Invoices" or "Invoices (Not Advanced)" buttons at the top of screen 82, the funding source operator may view screens 84 and 86, respectively shown in FIGS. 10B and 10C. Each advance shown in screen 82 may be based on multiple invoices, and screen 84 therefore lists the individual invoices upon which advances have been made. Screen 86 lists those invoices that the client has submitted but that have not been factored.

The left-hand columns of screens 82, 84 and 86 illustrate a signaling system that indicates the status of each line item. In the present embodiment, the system is based on colors and shapes. Each color is linked to a specific shape. For example, squares are green, octagons are red, triangles are yellow, arrows are blue, and rectangles are black.

Each column describes a condition applicable to the advances or invoices. For example, referring to screen 82, columns 88 and 90 respectively describe whether each advance is closed (i.e., whether the invoices comprising the advance have been paid) and whether the advance has been posted to the general ledger. The color, and therefore the corresponding shape, of the symbol in each column indicates the status of the condition for the advance in the row in which the symbol appears. For screen 82, a green square in the "closed" column indicates that the advance has not closed. A red octagon indicates that the advance has closed. A green square in the "posted" column indicates that the engine has not yet run the period close and that, therefore, the advance has not been posted. If an advance is green, it can be changed. A red octagon indicates that the advance has been posted and can therefore not be changed or deleted. Screen 82 provides the funding source operator with the option to view all advances or only open advances (i.e., those with green squares in the "closed" column). To access the information for a given advance, the funding source clicks on the advance code for the desired advance. This lists all invoices associated with the advance.

Screen 84 is an expansion of advances into invoices. Accordingly, it also includes "closed" and "posted" columns and employs the same color/shape conventions to indicate the status of those conditions. The logic engine assigns symbols to the "closed" and "posted" columns for each invoice based on payments received by the funding source and entered into the system, either automatically or by the funding source manually. Payment entry is described below.

The engine posts all payments received, and all funds advanced, at each posting period (e.g. daily). When an advance is entered into the system, its status, and therefore the status of its invoices in FIG. 10B, is a green square until the next daily transaction posting. When the advance is posted, the engine changes the symbol for the advance and the affected invoices to a red octagon.

Similarly, the engine places a green square in the "closed" column for newly executed advances. When the customers pay all the invoices under a given advance to the funding source, and when a funding source operator enters the appropriate information to indicate such payments, the engine changes the symbol in the "closed" column from a green square to a red octagon.

Referring now to FIG. 10C, the four left-hand columns 92, 94, 96, and 98 also employ the symbol convention. As discussed above, "Closed" column 92 refers to whether the invoice has been paid. "Verified" column 94 indicates whether the funding source has received sufficient confirmation that the invoice is legitimate. The verification standard may vary depending on the invoice amount and is determined by the funding source. For example, for invoices less than $500, the funding source may be satisfied by confirmation that the subject goods have been placed in the hands of a carrier. For invoices between $500 and $5,000, the funding source may require confirmation from the carrier's database that the goods have been received by the customer. For invoices greater than $5,000, the funding source may require verbal confirmation from the carrier or other reliable source that the subject goods have been delivered.

As described above, the invoice information received from the portal may include a carrier of goods and a tracking number. Periodically, for example every thirty minutes, the logic engine automatically accesses the Web site for the carrier 101 (FIG. 1) identified in each non-verified invoice, as indicated at 102 in FIG. 1. It finds the invoice's tracking number and confirms from the carrier's database whether the goods were placed in delivery and whether they have been received by the customer. The engine may automatically update the verification status based on this information. For example, if the carrier Web site indicates that goods for a given invoice have been placed in delivery, and the invoice is less than $500, the engine will indicate that the invoice has been verified to the satisfaction of the funding source.

If the invoice is of such an amount that it must be manually verified, or if no carrier and tracking number are identified, the funding source may take steps as it deems appropriate to verify the invoice. As each invoice is verified, the funding source operator manually changes the verification status, as described in more detail below.

A green square at column 94 indicates that the invoice has been automatically or manually verified to the satisfaction of the funding source. A red octagon indicates has verification has not yet begun. This is the initial symbol for all invoices. A yellow triangle indicates that verification is in process. A black rectangle indicates that the invoice cannot be verified. This may occur for a variety of reasons, for example that goods under the invoice have been damaged. In addition, the funding source may manually activate this symbol when manual verification is unsuccessful or where the funding source otherwise determines that the invoice is invalid. A blue arrow indicates that automatic verification has been attempted but has failed. For example, if an incorrect tracking number was provided in the invoice information, and the engine therefore failed to verify the invoice during automatic verification, the blue arrow indicates that the funding source should manually verify the invoice.

The "NA" column refers to whether an executed notification agreement between the customer and the funding source has been received by the funding source. The notification agreement notifies the customer that rights to recover on its invoice may be transferred to the funding source and establishes the customer's agreement to pay the amounts due on such invoices to the funding source. A green square indicates that a notification agreement has been received, while a red octagon indicates that the agreement has not been sent. A yellow triangle indicates that the agreement has been sent to the customer but not returned, and a black rectangle indicates that the customer has refused to sign the agreement. The logic engine updates the symbols in this column as the funding source operator manually provides inputs indicating whether or not the agreement is received.

In the present embodiment, a notification agreement is specific to each customer but may apply generally to all the customer's invoices. Accordingly, if the funding source already has an executed agreement for a customer, the notification agreement status for a new invoice for that customer will initially indicate that the agreement is present. If no notification agreement is present, the funding source reviews the customer information, including a customer credit score, in determining whether it wishes to proceed with the advance request for invoices owing from that customer. If the customer information is satisfactory, the funding source may forward a notification agreement to the customer for execution. When the funding source receives the executed agreement, it enters that information for the corresponding invoice. This procedure is described in more detail below.

The "credit" column refers to whether the funding source has verified the client's credit worthiness. A green square indicates that the funding source has established a credit score and credit limit for the client. If the funding source has not yet established credit for the client, the symbol is a red octagon. If the funding source has begun to assign credit but has not completed the process, the symbol is a yellow triangle. If the funding source has chosen to give the customer no credit, the symbol is a black rectangle. The engine sets the symbol based on the client's credit score, described above with respect to FIG. 10C.

Columns 92, 94, 96, and 98 provide a quick visual assessment whether the conditions defined by the funding source have been met to factor a given invoice. The symbols for the columns are chosen such that one symbol, in this case the green square, is the positive symbol for each column. That is, the green square indicates for each column that the status of that column's condition is appropriate to advance funds on the invoice. Thus, if all four columns have a green square, the invoice may be advanced. If any one column has any symbol other than a green square, however, the invoice should not be advanced.

The funding source may choose to advance funds, as indicated at 100 in FIG. 3, on an invoice based on the conditions in columns 92-98. The method of advancing funds depends on the agreement between the funding source and the client. If the client has provided sufficient account information, the logic engine may execute a wire to that account. Of course, there may be any suitable arrangement. For example, upon detecting that the conditions in columns 92-98 are acceptable for advancing funds, the logic engine may automatically send a request to the funding source to print a check that the funding source then manually forwards to the client. Alternatively, the funding source operator may review screen 86, determine which invoices to advance, and manually advance funds.

The screens shown in FIGS. 10A, 10B and 10C include information input by system operators and calculated by the engine. Generally, this information should be familiar to those of ordinary skill in factoring transactions. For example, FIG. 10A illustrates a screen that describes information related to advances. Columns 104 and 106 display the date funds were advanced and a code assigned to the advance by the engine. As discussed above, an advance may be made on multiple invoices. Accordingly, the total amount of the invoices upon which the advance is made, less any discount, is described in column 108. Column 110 provides the amount advanced on the invoices, while column 112 describes the initial reserve amount, i.e., the difference between columns 108 and 110. Column 114 describes payments made by customers on the invoices represented by column 108. If a customer is over or under on one or more invoices in the group, this amount is accumulated and displayed in column 116.

Column 118 describes the amount of the payment in column 114 that is applied to recovery of the advance in column 110. As invoices are closed due to payments, the system allocates discount and interest fees and establishes rebates for payment to the client. These amounts are listed in columns 120, 122 and 124.

Column 126 lists the outstanding balance of the invoices from column 108 after the payments and overs/shorts listed in columns 114 and 116. The amount of this balance attributable to the advance amount is listed in column 128, and the accrued discount fee and interest on the balance are listed in columns 130 and 132, respectively. The remaining reserve amount, shown in column 134, is equal to the accounts receivable balance in column 126, less the discount fee, interest and unrecovered advance. Commission fees, guarantor fees, insurance fees, minimum invoice charges and wire fees, if present, are also subtracted from the net reserve of column 134.

Referring now to FIG. 10B, invoice screen 84 lists the customer and number for each invoice in columns 136 and 138, respectively. Column 140 describes the amount of the invoice, while column 142 describes the amount of the invoice against which the funding source chooses to apply the advance rate. The amount advanced on the invoice is shown in column 144 and is equal to the amount in column 142 multiplied by the advance rate. Column 146 describes the charge back date, i.e., the date on which the advance amount and fees are charged back to the client if the invoice is not paid by the customer. The charge back date may be extended by the funding source. Any such extensions are shown in column 148. If an invoice is charged back to the client, the charge back amount is listed in column 150. Column 152 describes any payments made on the invoice by the customer, and column 154 provides any amount by which the customer is over or under the invoice amount. Columns 156, 158, 160, 162, 164 and 166 describe discount fees, interests, commission fees, guarantor fees, insurance fees and minimum invoice charges applied to the factoring transaction. Once the invoice is paid, its closing date is indicated in column 168. Column 170 describes the aggregate received relative to the advance.

The "Invoices Not Advanced" screen 86 shown in FIG. 10C again lists the customer name, invoice number, invoice date, invoice original amount and the invoice advance amount. It also lists the date, if available, the invoice was mailed and the date and time at which the invoice was verified.

Figure 11:
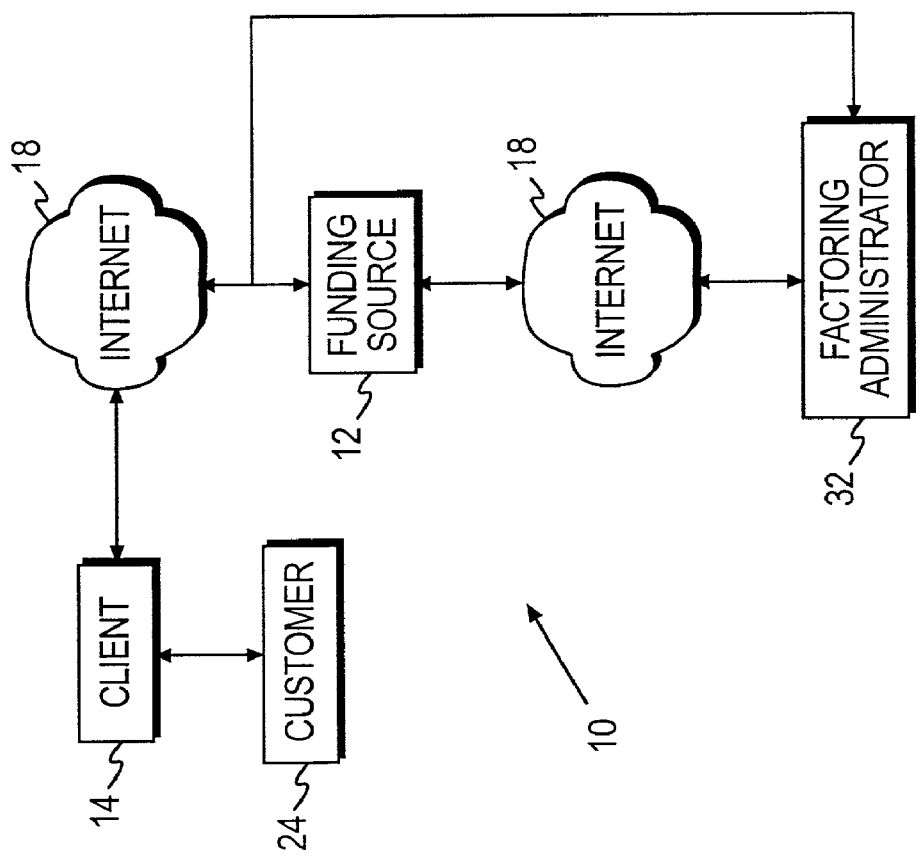
FIG. 11 is a diagrammatic view of a factoring system according to an embodiment of the present invention.

As noted above, the portal configuration is but one example of a factoring system and method according to the present invention. Referring to FIG. 11, for example, the factoring transaction may take place through the Internet without a portal. Client 14 may have one or more invoices with one or more customers 24 that the client wishes to factor. The client contacts a funding source 12 through the Internet 18 by searching for the funding source's Web site with the client's web browser. The funding source may provide a Web page with a factoring icon that may be activated by the client. Upon activation of the icon, the client is automatically linked to logic engine 44 (FIG. 1) that in turn presents the client with a screen that requests whether the client has previously registered with the funding source factoring service. If the client positively responds and correctly identifies itself, the logic engine presents the client with a screen that includes options by which the client may submit invoices.

The process by which the client inputs this information is described in more detail below. Generally, however, the client may import the invoice data in a pre-defined format, for example EDI, or may fill out an electronic invoice form presented by the logic engine. The invoice information may be similar to that described above with respect to the embodiment of FIG. 3.

The invoice information includes the identity of customer 24. Where the client completes an electronic invoice form provided by the logic engine, the form may include a pull-down list of customers whose invoices funding source 12 has factored in the past. That is, the pull-down list provides a list of customers falling under funding source 12 in the data hierarchy shown in FIG. 2. If the client selects one of these customers for a given invoice, the logic engine populates the invoice's customer-related information with the database information. If the customer is not present on the pull-down list, the client enters the customer information, and the engine stores this information in association with the invoice.

If the client has not previously registered with the funding source, engine 44 provides an electronic application form to the client as shown in FIG. 4A. Once the client completes this information, a login identification and password is established for the client, and the client proceeds to input invoice and customer information.

After inputting the invoice information, the client selects one or more of those invoices upon which to request an advance, and the engine notifies funding source 12 of the request. Funding source 12 then accesses factoring administration system 32 through Internet 18. If the client is new to the funding source, the funding source may review the client information and execute the client scoring procedure, and accept or decline the client's application, as described herein.

If the client already exists, the funding source may update information as appropriate and revise the client's score.

The funding source then reviews the invoices, as described above with respect to FIG. 10C, and determines whether to advance funds on one or more of the invoices for which the client has requested funds. The funding source may advance funds in any suitable form as agreed between the funding source and the client.

Figure 12:
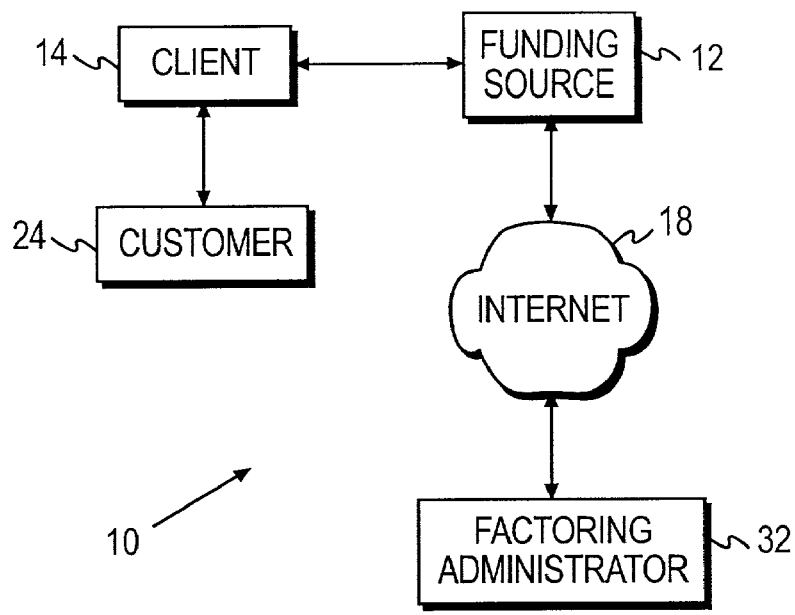
FIG. 12 is a diagrammatic view of a factoring system according to an embodiment of the present invention.

Referring to FIG. 12, it should be understood that client 14 may request funds from funding source 12 in any suitable manner. For example, client 14 may choose to provide to the funding source a non-electronic written request, an oral request, or an electronic request outside factoring administration system 32 and to provide all related information to the funding source in this manner.

Figure 21:
FIG. 21 is an exemplary screen display for use in an embodiment of the present invention.

Upon receiving the advance request, funding source 12 accesses factoring administration system 32 through Internet 18 and searches database 48 (FIG. 1) for client 14. If the client is present in the client files for the funding source, the funding source may update the client's information in its files and the client's credit score. If the client is not present, the funding source enters the client information and scores the client in determining the client's credit worthiness. In submitting client information, the funding source may complete an electronic form presented as a Web page by the logic engine, as shown in FIGS. 4A and 21, or may download client data collected by the funding source or submitted to the funding source as a data form in a predefined format, for example EDI.

If the funding source accepts the client, it then inputs information describing the invoices upon which the client has requested advanced funds. Again, the information may be similar to that described above with respect to FIG. 3. The funding source may input the invoices manually through an electronic form on a web page presented by the logic engine, as described in more detail below, or may download a data form in a predefined format.

As described above, the invoice information includes the identity of customer 24. Where the funding source completes an electronic form provided by the logic engine, the form may include a pull-down list of customers whose invoices the funding source has factored in the past. That is, the pull-down list provides a list of customers falling under funding source 12 in the data hierarchy shown in FIG. 2. If the funding source selects one of these customers for a given invoice, the logic engine populates the invoice's customer-related information with the database information. If the customer is not present in the pull-down list, the funding source may search the repository of customer files in database 48 (FIG. 1). If the customer is present in the repository, the client may choose to save the repository information to a customer file saved as part of the funding source's files in the database and populate the invoice's customer-related information with the repository information. If the customer is not present in the repository, the funding source may request information about the customer from the client. The client may provide the information to the funding source so that the funding source may manually enter the information into the appropriate data fields, or the client may provide the customer information electronically, for example through an electronic form provided by the factoring administrator through the Internet or as a data file in a predetermined format.

The funding source then begins the invoice review. Once the client, invoice and customer information is entered, this process is the same as that described above with respect to FIGS. 3 and 11 and includes customer scoring, invoice verification and notification agreement confirmation. If the funding source chooses to advance one or more invoices, it may advance funds in any suitable form as agreed between the funding source and the client.

Figure 13:
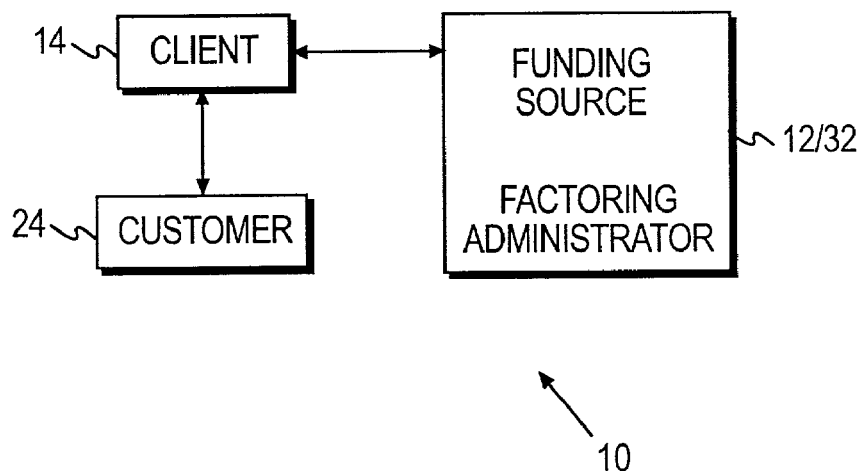
FIG. 13 is a diagrammatic view of factoring system according to an embodiment of the present invention.

Referring now to FIG. 13, it should also be understood that the funding source and the funding administrator may communicate in any suitable manner. In this embodiment, transactions and communications between the customer 24 and client 14, and between client 14 and funding source 12, may take place in any suitable manner. Funding source 12 and factoring administrator 32 may be considered a single entity, for instance where logic and reports engines 44 and 46 (FIG. 1) and database 48 (FIG. 1) reside on a suitable computer system at the funding source or where the funding source contracts with a physically separate funding administrator such that the funding administrator operates at the instruction of the funding source. In either arrangement, the funding source may perform the same functions described above with respect to embodiments in which the funding source communicates with the funding administrator through the Internet. Thus, it should be understood that all such suitable system configurations are included within the scope and spirit of the present invention.

B. Multi-Currency Support

As described above, the logic engine processes invoices, payments and advances in various currencies. The engine is programmed to recognize a plurality of currencies identified in database 48 (FIG. 1) by pre-defined currency identifiers (e.g. USD for U.S. dollars). The currency identifiers themselves may take any suitable form but are preferably chosen so that they relate in some manner to the currencies they represent.

Figure 14:
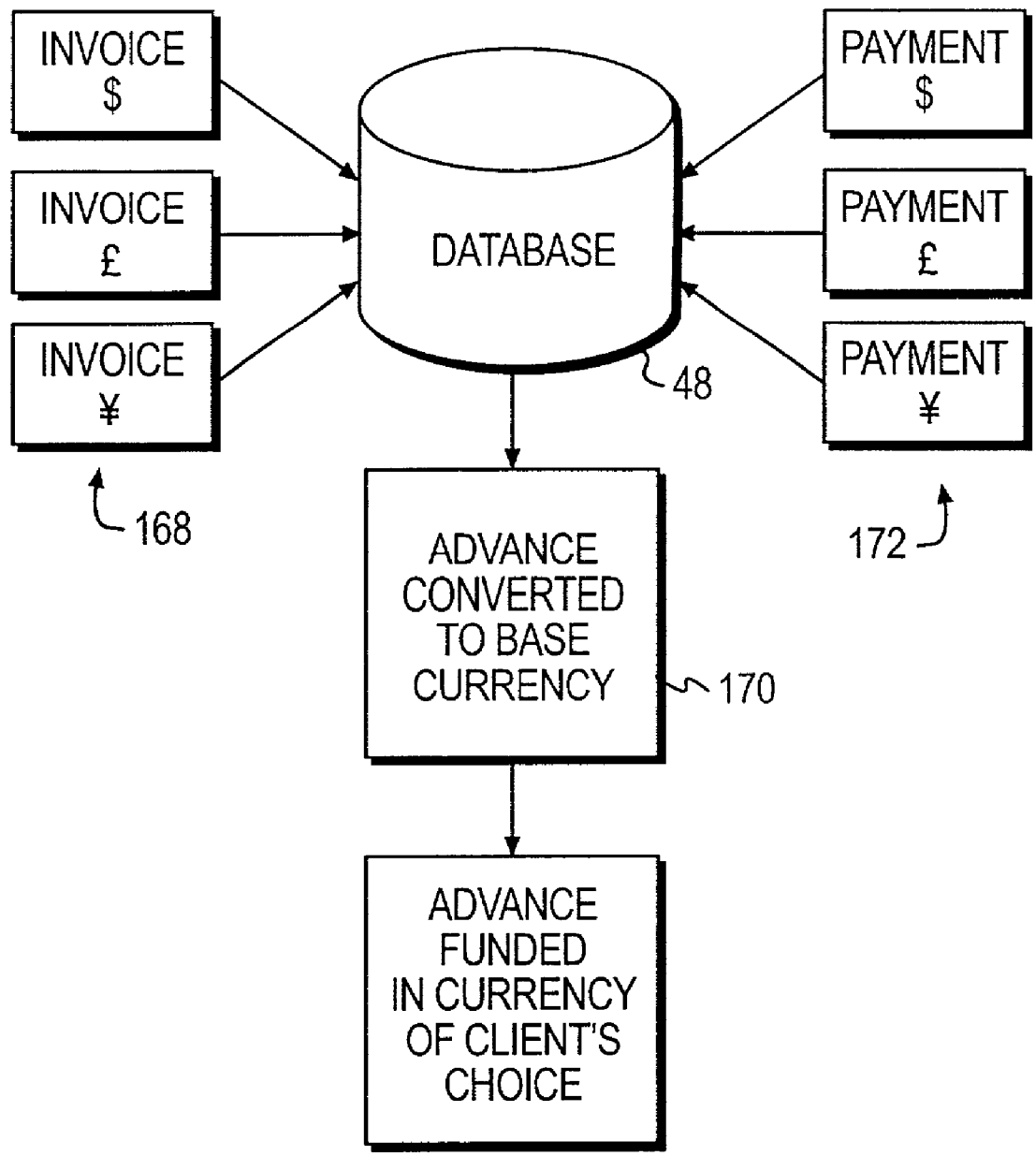
FIG. 14 is a schematic illustration of multi-currency invoice and payment submission and funding advance.

Referring to FIG. 14, currency is defined for each invoice 168 submitted to database 48. In downloaded data files, currency may be an identifier included for each invoice as part of a pre-defined form. Where invoices are submitted through completion of an electronic form presented as a Web site, a pull-down box may be provided so that the client may choose the appropriate currency from a list of currencies supported by the system.

In executing an advance, the funding source selects the currency, as determined by the client, in which the funds are to be transferred to the client. If the advance currency is different from the currency identified for one or more invoices covered by the advance, the engine converts the invoice currency in determining the advance amount, as indicated at 170.

Payments 172 are typically received in the currency requested by their corresponding invoices 168. The funding source identifies the payment currency when entering payment information into database 48. The logic engine converts the payment amount to the advance currency in updating the advance reports. The funding source may update the currency exchange rates manually or automatically. For example, the logic engine may periodically access a database that maintains current exchange rates and update its exchange rates accordingly.

C. Business Rules

In the embodiments described above, the funding source determines whether or not to advance funds for a given invoice, or group of invoices, based on criteria applicable to the specific invoices. In one preferred embodiment, the logic engine also screens advances for other invoice-specific, customer-specific and/or client-specific criteria. The engine checks these criteria after the funding source has selected invoices upon which to advance funds. That is, once the funding source has decided to advance on one or more invoices, the engine checks these additional criteria and executes the advance only if the invoices meet the criteria. If any invoice fails any of the criteria, the engine notifies the funding source that the advance is denied. In certain circumstances, the funding source may override the denial. It should be understood, however, that certain of these criteria could be applied to the invoices prior to selection by the funding source and could be provided indicators in appropriate columns added to the invoice report illustrated in FIG. 10C.

Figure 15:
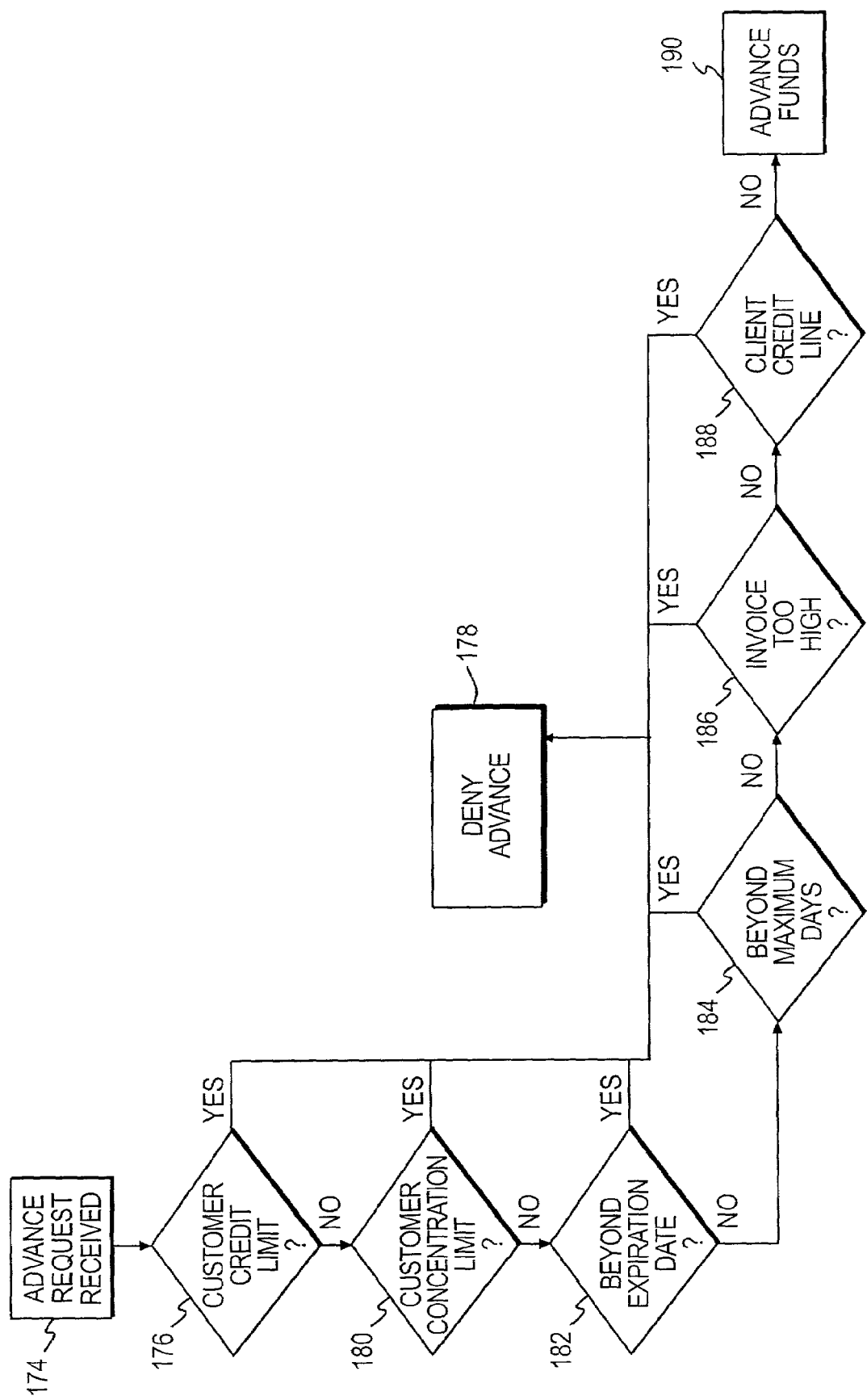
FIG. 15 is a flow chart illustrating an automatic business rule confirmation following a decision by a funding source in an embodiment of the present invention to advance funds to a client.

Referring to FIG. 15, when the funding source executes an advance at 174 the engine determines at 176 whether any customer obligated in an invoice covered by the advance has exceeded its credit limit as defined by the funding source. If so, the invoice is denied at 178, and the funding source is so notified. The funding source may then deny the entire advance, eliminate the invoice(s) concerned and request a new advance, or override the denial.

If no customer credit limit is exceeded on the invoices covered by the requested advance at 176, or if the funding source overrides a denial based on that criteria, the logic engine determines whether any customer on an invoice covered by the requested advance has exceeded its concentration limit at 180. That is, is the total number of invoices factored by the funding source for this customer greater than a predefined percentage of the total invoices factored by the funding source for the client? This percentage limit is set by the funding source and applies to all customers. In another preferred embodiment, however, the concentration limit may be defined by the funding source on a customer-specific basis as part of the general information collected for each customer. Thus, for example, invoices for a first customer may be allowed to reach ten percent (10%) of the total invoices factored by the funding source for a client, whereas invoices for a second customer may not be allowed to exceed five percent (5%) of the total.

If the advance requested at 174 would cause the concentration limit to be exceeded for any customer on an invoice covered by the advance, the advance is denied at 178. If the advance does not cross the concentration limit, or if the funding source overrides a denial based on the concentration limit, the logic engine determines at 182 whether the funding source has any outstanding invoices, for any client on an invoice covered by the advance requested at 174, beyond the invoice's expected collection period. If any such customer has a late invoice owing to the funding source, the engine denies the advance at 178. The funding source may finally deny the advance, remove all invoices from that customer and resubmit the advance, or override the denial.

If no customers have overdue invoices at 182, or if the funding source overrides such a denial, the engine checks at 184 whether the invoice is outstanding for a number of days greater than a pre-defined maximum number of days. In one embodiment, the maximum days is defined by the funding source at the branch level. If the invoice is outstanding for a period greater than the maximum days, the engine denies the advance at 178. Again, the funding source may finally deny the advance, remove the overdue invoices and resubmit the advance, or override the denial.

If no invoice in the requested advance is beyond the maximum days at 184, or if the funding source overrides such a denial, the engine checks at 186 whether any invoice in the requested advance is greater than the maximum amount permitted to be advanced on any invoice for the requesting client. In one embodiment, the maximum invoice amount is defined by the funding source at the branch level. If any invoice in the requested advance is greater than the maximum amount, the engine denies the invoice at 178. The funding source may finally deny the advance, remove the excessively high invoices and resubmit the advance request, or override the denial.

If no invoice in the requested advance is too high at 186, or if the funding source overrides such a denial, the engine determines at 188 whether the requested advance would cause the total amount of funds currently extended to the client by the funding source to exceed a predefined credit limit for the client. The credit limit is defined by the funding source in a rate schedule discussed below. If the advance causes the funds currently advanced to the client to exceed this limit, the engine denies the advance at 178. The funding source may finally deny the advance, remove sufficient invoices so that the credit limit is not exceeded, or may override the denial. If the advance does not exceed the client's credit limit at 188, or if the funding source overrides such a denial, the funding source advances the requested funds at 190.

The discussion above with respect to FIG. 15 assumes that the funding source may override any of the denials. The system may also be configured so that the funding source is able to override only certain denials. In one preferred embodiment, for example, the funding source is unable to override a denial based on the client credit limit, the customer credit limit or the customer concentration limit but is able to override denials based on the invoice amount, the invoice maximum days and the existence of other past-due customer invoices.

D. System Procedures

In the embodiments described above, the funding source and its clients access the funding administration system. The following is a description of procedures through which this occurs. Although the discussion is set primarily in the non-portal environment illustrated in FIG. 12, various procedures apply to other or all of the embodiments. Furthermore, in light of the explanation of the embodiments above, those of ordinary skill in this art should understand changes that may be appropriate in these procedures from one embodiment to another.

Initially, the logic engine presents a funding source attempting to access the system over the Internet with a Web page that includes the funding administrator's name and a login icon which, when activated by the funding source, triggers a login screen. The login screen includes a field for the funding source identification and password. Upon entering this information, the funding source accesses the system.

When the funding source accesses the system, certain of its users may be designated with the authority to change system parameters. When such users access the system, the logic engine presents them with successive screens that prompt them regarding whether they wish to change the prime rate, update currency rates, and check maintenance reports. Each funding source user is recorded in a data file for the funding source in database 48 (FIG. 1).

Generally, a client accesses the funding administrator through the funding source. Thus, for example, the customer may activate a factoring services icon on the funding source's Web page that links the client directly to a login screen for the factoring administrator. The screen is presented, however, as part of the funding source system. Thus, the client often does not see a screen that identifies the factoring administrator.

1. Posting Periods

Figure 16:
FIG. 16 is an exemplary screen display for use in an embodiment of the present invention.

An authorized funding source user has the ability to define posting periods at which the engine calculates fees and interest. Posting periods are predefined to run daily at a predetermined time based on a five-day work week, each week ending on a Friday and each month ending on the last business day in the month. By selecting the appropriate screen, the funding source user is presented with a screen 192 as shown in FIG. 16. The screen illustrates the current date, or a selected date, and the subsequent seven (7) business days. Business days default to being "open" posting days, as indicated by green squares in the screen's left hand column. If the user selects "closed" or "all" options in a pull-down box 194, screen 192 illustrates recent closed posting dates having red octagons in the "closed" column. A red octagon in the "locked" column indicates that posting has occurred and the posting information cannot be changed.

If a user clicks onto one of the dates in screen 192, the logic engine presents a screen that displays the posting date and the prime rate. The screen provides yes/no pull down boxes by which the user may define whether the period is closed, the end of the week or the end of the month. If the date is unlocked, the user has ability to manually close or open the date and define the day as an end of week or end of month.

2. Default Fees

Screens 198, 200 and 202, respectively illustrated in FIGS. 17, 18 and 19, permit the funding source to enter system default fees, in this case commission fees, guarantee fees, discount fees and interest rates. The funding source determines which fees to apply to a given advance through a procedure described below with respect to Appendix 2. Referring to FIG. 17, a pull-down box 204 is used to select and review a commission fee. Upon selection of the commission fee in box 204, the engine presents the user with a screen 200, shown in FIG. 18. Screen 200 illustrates the current commission fee value, in this case one percent (1%), and repeats the current value in a "new values" field. The user may elect to change the commission fee by changing the new value field and clicking the "Update Database" button. By checking the "Default" box, this commission fee is automatically applied in rate schedules for all the funding source's advances.

The funding source may also select the guarantee and discount fees or the graduated discount fee through box 204 by screens similar to screen 200 in FIG. 18.

The commission fee is a percentage applied to one of three values:

(1) The total amount of all invoices upon which advances have been made for a given client, (2) The total amount of funds advanced to the client, or (3) The average amount of outstanding advances over a pre-defined period.

The discount fee can be based on a flat or a graduated rate applied against the total invoice amount or the amount advanced on the invoice. A flat discount fee applies against this amount, regardless of the payment period. A graduated discount rate is a percentage that applies to each advanced invoice, where the rate varies depending upon the period at which the invoice pays after the advance. The funding source defines the initial graduated rate, the incremental percentage by which it will increase and the time increment at which it will increase.

A guarantee fee may be charged as:

(1) A percentage of the total value of the unpaid balance on all advanced invoices for the client, (2) A percentage of the total unpaid balance of all invoices entered into the system by the client, (3) A flat charge per advanced invoice (accrued at the time of advance and recovered at the time of payment), (4) A flat charge per invoice entered into the system, and (5) A percentage of the average outstanding advance amount.

The system may support multiple interest rates. Screen 202 permits the funding source to name each rate.

3. Data Hierarchy

The funding source may also define regions, sub-regions, branches and loan officers. The logic engine provides an option tree to allow the funding source to select screens in which to input information describing each entity. For each region, a name, description, e-mail address and URL is defined. Contact and address information is also requested.

The funding source defines sub-regions under each region. After defining the name and description of each sub-region applicable to the region, the funding source may select a screen to enter similar contact and address information for the sub-region.

The funding source may define branches for each sub-region and may define contact and address information for each branch. In addition, the engine provides fields in a branch information screen in which the funding source may define the maximum invoice amount and maximum invoice age values described above. The user also defines a "days prior to charge back" field, which refers to the number of days prior to the expiration of the charge back period that will cause the engine to include an invoice in a report of invoices on which follow-up is needed.

Finally, the funding source may define loan officers for each branch. Upon selecting this option, the engine provides a screen for each loan officer in which the funding source may enter the officer's name, identification number, title and address information.

4. Client Information

Referring again to FIG. 11, when client 14 requests factoring services from funding source 12 through its Web site, the client is linked to factoring administrator 32 and is presented with an electronic application, as described above with respect to FIGS. 4A-4E. By activating an "I Agree" button, the client submits the application to the factoring administrator for the funding source. When the funding source accesses the system, it selects a search screen by which it may search for all electronic client applications submitted to it over a selected time period. If the funding source chooses one of the applications, the logic engine places the application information into the appropriate data fields of the screens shown and described in FIG. 9A and Appendix 1. The funding source may then score the client as described above with respect to FIGS. 43 and 9B, decide whether to accept or deny the application and notify the client of its decision directly or by email.

In those instances where the client manually requests services from the funding source, the funding source itself adds client information. It first accesses the factoring administration system and selects a "Branch List" icon. After selecting the desired branch that will service the client, the funding source selects an "Add New Client" icon and is presented with the screens discussed above with respect to FIGS. 9A and 9B and Appendix 1.

In the "Terms To Apply" field, the funding source may choose "Invoice Paid By Date" or "Invoice Paid by Days." "Date" refers to the day in the month in which the invoice is due. For example, a "28" in the "Paid by Date/Days" field means that the invoice must be paid by the 28th of that month. If the funding source selects "Invoice Paid By Days," a 28 in the "Paid By Date/Days" field means that the invoice is to be paid by 28 days after the invoice date.

Where the client provides its information in an application similar to that shown in FIGS. 4A-4E, the funding source enters the client information into the first sixteen fields of screen 68 in FIG. 9A. The "Terms to Apply," "Paid by Date/Days," "Discount" and "Discount Terms" fields are typically filled by information provided by the client after the application is processed. The remaining two fields are filled by the funding source.

The "Discount" field refers to a percentage of the total invoice amount that the client typically discounts from the invoice if the customer pays the invoice within the "Discount Terms." For example, assume that an invoice is for $100, the discount is 2% and the discount terms is 30. The customer owes only $98 if it pays the invoice in full (less the discount) within 30 days of the invoice date.

The "Advance Against Invoice" field allows the funding source to choose whether to apply the advance rate against the full invoice or a lesser percentage of the full invoice amount. For example, a funding source wishing to keep 20% of the invoice amount in reserve will establish the advance rate at 80%. If the client always gives a 2% discount, however, the funding should apply the advance rate to 98% of the total invoice amount to maintain the 20% reserve.

5. Funding

Once the funding source has set up a client, it has several options relating to funding advances for the client. Generally, these include (a) rates applicable to the client, (b) customer information, (c) invoice submission, (d) invoice verification, (e) advances, (f) collections and follow-ups, (g) searches, (h) remittance and (i) rebates.

a. Client Rates

As noted above, rates are set at the client level. To set rates, the funding source activates the "Search" icon after login and selects the appropriate client. From the general client screen (FIG. 9A), the funding source activates a "Funding" icon at the screen's left hand column, producing an option list from which the funding source may choose a "Rates" icon to reach a rates display screen. If a rate schedule exists for this client, it is identified in the screen. To add a new rate schedule, the funding source activates an "Add New Rate Profile" icon. The engine then displays a profile identification screen at which the funding source names the profile and defines the client's credit line, advance rate, charge back day and minimum invoice charge. A yes/no pull-down list is provided to allow the user to define whether rebates are paid only from advances paid in full. The system automatically inserts the rate profile's start date.

As noted above, the advance rate is the percentage applied to the invoice amount to determine the amount of funds advanced on a given invoice. The charge back day is the number of days following the advance date on which the advance amount and related fees will be charged back to the client if the corresponding invoice has not been paid. The minimum invoice charge is the lowest amount of advanced funds and related fees that may be charged to the client.

Upon activating the "Add" icon in the profile identification screen, the logic engine displays a fee selection screen that provides a list of all fees supported by the system (Appendix 2). The funding source chooses fees to apply for this client by clicking in a "Select" box to the left of the fee. Upon clicking an "Update Fee Schedule" icon, the engine displays a fee setup screen that lists the fee types selected at the fee selection screen. To set up the fee structure for each fee, the funding source activates a "Configure Fee" icon to the right of the fee type. Activation of this icon presents a screen for the applicable fee having appropriate data fields in which the funding source may enter the fee parameters.

As discussed above, the funding source may define default values for the commission fee, guarantee fee, and discount fee. If the funding source selects any of these fees, the default values automatically populate the fields. The funding source may, however, reconfigure the fees at this stage for each client. The commission fee, discount fee, and guarantee fees are described above. In the configure screens, the funding source may select the basis upon which the commission fee will be applied, its period, and the day of the week on which the fee will be applied, as well as the commission rate. The funding source may also define a flat discount fee and a schedule for a graduated discount.

The administrative fee is a flat amount charged each time (a) an invoice is entered into the system (whether or not advanced), (b) a payment is entered into the system, or (c) an advance is made to the client. The funding source may choose to apply the administrative fee on a weekly or monthly basis and may define an administrative fee for each of the three types of charges.

The borrowing base charge is an interest-type fee calculated from the average total accounts receivable. The funding source may define the period at which the charge will be applied (e.g., weekly) and the time at which it will be applied (e.g., the day of the week). The funding source also defines the basis, (e.g., prime rate) for the charge and the adjustment to the basis (e.g., a 1% increase).

The commitment fee is a percentage of the client credit line limit charged to the client's reserve monthly, quarterly, or annually.

Float days refers to the number of days a customer's check requires to clear its bank. The funding source defines this parameter, which is added to the number of days the invoice takes to pay in order to calculate fees and interests.

The insurance fee is charged on the same basis as the guarantee fee.

The interest fee charges compound interest based on a set annual percentage rate that can be set to calculate off of a 360-day year or a 365-day year. The funding source may choose to base interest calculations on Prime Rate, Libor or other predefined rate and can adjust the interest above or below the defined base rate. The funding source may also choose to calculate interest against the amount of funds advanced to the client or the average of the advanced funds over a defined period.

The minimum advance charge is a fee against the difference between a minimum level a client agrees to fund and the actual amount funded. The funding source must define the minimum dollar amount the client agrees to fund, a period (for example monthly, quarterly or annually) and the percentage rate to be charged against the difference. At the end of the period, the logic engine calculates the total amount of invoices purchased for that period. If the amount purchased is less than the minimum amount, the client's reserve account is charged the specified percentage against the difference.

The processing fee is charged in the same manner as the administrative fee. These fees are charged to the client's reserve account on a weekly or monthly basis, as defined by the funding source.

The set-up fee is a flat charge for each customer added into the system for the client. The fee is charged to the client's reserve at the time the customer is created.

The transaction fee is defined in the same manner as the administrative fee and the processing fee. The wire fee is a flat charge per advance. It is deducted from the advanced funds.

b. Customer Information

Figure 20:
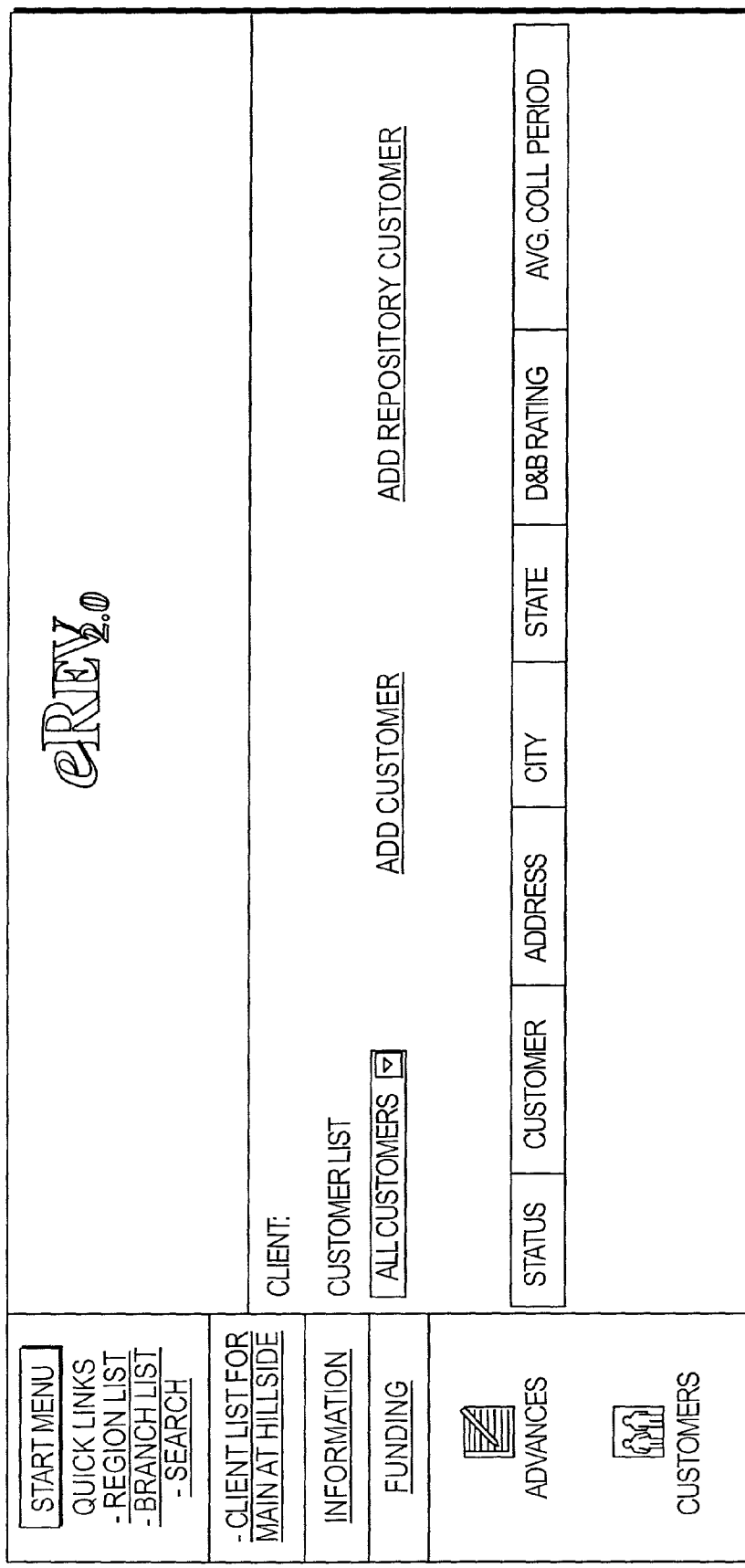
FIG. 20 is an exemplary screen display for use in an embodiment of the present invention.

To set up customer information, the funding source activates a "Customers" option (FIG. 20) from the funding selection described above, thereby causing the logic engine to present a screen 214 shown in FIG. 20. If any customers have been previously entered for this client, either directly by the funding source or through information provided by the client (for example through a data download or through an electronic application as shown in FIG. 4), screen 214 displays selected information about each customer in the illustrated columns. To add new customer information, the funding source activates the "Add Customer" icon in screen 214 to present a screen 216 as shown in FIG. 21. The funding source may then enter the appropriate information in the first eleven fields. The bottom six fields are populated by the information defined at the client level as described above. That is, the client information defaults for all customers but may be changed by the funding source on a customer-specific basis.

Referring again to FIG. 20, the funding source may also add to its files a customer that is new to the funding source but that may be present in the repository of customers located in the funding administrator's data files. To do this, the funding source activates the "Add Repository Customer" icon at screen 214. The engine presents a search screen at which the funding source may enter terms that appear in the customer's name. Upon submission of the search, the engine presents a screen listing all customers that meet the search criteria. If the desired customer is present in the list, the funding source may click on the customer. The engine then creates a file for that customer under the funding source in the funding administrator's database and presents screen 216 (FIG. 21) populated with the new customer's information.

Referring again to FIG. 21, six tabs at the bottom of screen 216 link the funding source to additional customer information. Upon activating the "Customer Notes" tab, the engine presents a screen that displays notes that may be relevant to the customer. The screen includes an icon to allow the funding source to add additional notes. A similar set of screens allows the funding source to add, upon activation of the "Contacts" tab, information about contact individuals at one or more of the customer's places of business. A contact history exists for each customer contact. Upon activation of a contact history icon in the contact screen, the funding source may define action items, a date by which each action item is to be performed, the identity of a person at the funding source to execute the action item, and an indication whether the action item has been completed.

Upon activation of a "Notification" tab, the engine presents a screen at which the funding source indicates the status of the notification agreement for this customer (a pull-down box provides a list of possible entries, e.g., whether an agreement has been mailed to the customer and whether it has been received and filed), the identity of the customer's employee who signed the agreement, the date the agreement was signed, and any notes regarding the agreement.

The funding source may enter the customer's mailing address through a screen activated by a "Mailing Address" tab at screen 216. A "Procedures" tab allows the funding source to define specific procedures specific to the customer, for example to contact an individual when verification is required.

Each customer screen includes an icon permitting the funding source to view aging and payment history reports. The aging report describes aging accounts receivable for customer invoices owed to this particular client. The payment history report is a detail of all payments made by this customer to this client.

Upon activating the "Credit" button, the engine presents a screen 220 shown in FIG. 22. The screen displays the customer's current credit score and credit limit. To update the credit score, or to create a credit score for a new customer, the funding source activates a "Score Customer" icon, thereby presenting a screen 222 shown in FIG. 23. Screen 222 is specific to the funding source. That is, the funding source defines an algorithm that the funding administrator implements in the logic engine specifically for the funding source. Thus, the screen shown in FIG. 23 may vary widely, depending on the criteria used by the funding source to determine whether it deems a customer to be sufficiently credit worthy that the funding source will factor its invoices. In the example shown in FIG. 23, the funding source has defined five criteria. For each, there is a plurality of pre-defined responses that may be selected from pull-down boxes 224. Scale factors applicable to the criteria may be chosen from pull-down boxes 226. The scale (e.g. a number from 1 to 10) multiplies the initial score for the respective criteria to produce component scores 228. The component scores are combined in a predetermined equation, in this case a simple summation, to produce a final score 230.

The algorithm also includes a pre-determined relationship between the final score and the customer credit line. That is, the engine determines the customer credit line based on the total customer score. The funding source can override the credit line by directly inputting the credit line in box 232.

The funding source may view several customer credit screens. Referring to FIG. 24, a screen 234 illustrates the customer's payment statistics with respect to the client. The engine calculates all fields in screen 234, except for the default expected collection period, which the funding source inputs. As discussed above, invoices for this customer will be denied for advance if any other invoices for the customer are outstanding beyond the number of days shown as the default expected collection period.

The average invoice amount is the average of all invoices funded through the system for this client/customer relationship. The average days past terms is the average number of days that invoices are paid beyond the actual invoice terms. That is, if the customer on average pays 10 days late, the engine places a 10 in this field. The calculated expected collection period is the average number of days beyond the invoice date that the customer pays its invoices. The number in parentheses is the number of invoices used in the calculation. The default number of invoices past the expected collection period is the actual number of invoices past the expected collection period defined by the funding source. The calculated number of invoices past expected collection period is the actual number of invoices past the expected collection period calculated by the system. The engine also calculates the standard deviation of the actual invoice payment from the expected collection period. "Trend" indicates whether the customer's payment period is decreasing, steady, or rising.

The funding source may also review the customer's payment statistics with the funding source as a whole and with respect to the repository, as shown in screens 236 and 238 in FIG. 25. The expected collection period is the average number of days in which the customer pays its invoices. The number in parentheses reflects the number of invoices that form the calculation. The standard deviation is the actual payment deviation from the expected collection period.

c. Invoice Submission

As discussed above, the funding source may manually enter invoices for which a client has requested funds to be advanced. Initially, the funding source searches for a client in the funding administrator database. Upon selecting the client and activating the "Funding" icon, the funding source selects the "Invoices Not Advanced" tab to produce screen 86 shown in FIG. 10C. Activating the "Add New Invoice" icon produces a screen 240 shown in FIG. 26. The funding source enters the customer information, invoice number and invoice date. If the customer exists for this client, the funding source may select the customer and its location from pull-down boxes. If the customer does not exist, the funding source may search the repository for, or manually enter, the customer information as discussed above.

The engine populates the invoice due date, discount, discount terms, invoice amount, amount to advance on and projected advance with the client-level information discussed above. The funding source may, however, change each of these fields. Thus, the client-level information provides a default that the funding source may override at the invoice level. The last three fields, relating to invoice verification, are explained below.

The top bar of screen 240 displays the criteria identifying whether the invoice has been verified, whether a notification agreement has been received from the customer and whether client credit has been established.

Returning to FIG. 10C, the funding source may submit multiple invoices by activating the "Add Multiple Invoices" icon. This produces a screen 242 shown in FIG. 27. Again, the funding source enters the client, customer and invoice information. The discount, discount terms, invoice due date and advance against invoice fields are populated by the engine and may be overwritten by the funding source. These terms apply to all invoices listed in the screen.

As described above, clients may also submit invoices. Where the client accesses the funding administration system, the engine displays a screen 242, as shown in FIG. 28, following the client's login or registration. Screen 242 permits the client access to various reports regarding its invoices and allows the client to submit invoices to the funding source for advance. For example, the client may activate the "Send eForm Invoice" icon to receive an invoice application screen 244 shown in FIG. 29. The client may fill in its location and contact from pull-down boxes that list the location and contacts of all the funding source's clients. Once the client information is entered, the client may enter customer information from pull-down screens tied to the identified client. The discount and discount terms fields default to those values defined by the funding source for the selected client. The client fills in the remaining information. The funding source may override these data fields through its invoice screens described above.

In another preferred embodiment, the client screen also includes a "Small Accounting Package Interface" icon through which the client can submit invoice and customer information directly from its accounting software. Upon activation of this icon, the engine presents a screen through which the client identifies the accounting package from a pull-down list of packages supported by the system. The screen also requests whether the file relates to customers or invoices and whether duplicate files will be submitted. The client then activates a browser icon that causes the engine to search the client's designated accounting package for all files of that type. The client selects each invoice it wishes to submit and clicks a submission button to submit the selected invoices or customer files to the funding source.

d. Invoice Verification

As indicated above, invoice verification is one of the criteria upon which a funding source may rely in determining whether to advance funds on one or more invoices. The present invention permits the funding source to verify invoices singularly or in groups and to verify manually or automatically. To manually verify a single invoice, the funding source searches for and selects the appropriate client, activates the funding icon and activates the "Invoices Not Advanced" tab (FIG. 10C). This presents a screen listing all invoices for the client. The funding source clicks on the invoice to be verified and is presented with a screen 246 shown in FIG. 30. The engine populates the first twelve fields with invoice information already stored by the system. If goods sold under the invoice were assigned a tracking number by a delivery company, this information may also be entered. The engine populates the "delivery status" field during automatic verification.

A pull-down box 248 lists the methods by which the funding source may verify an invoice. These may include (a) verbal verification from the customer and/or carrier of goods that the goods have been delivered and/or received, (b) a document from one of these parties establishing delivery and/or receipt of the goods, (c) a signature from one of these parties on a form provided by the funding source indicating delivery and/or receipt, or (d) some "other" method that may be approved by the funding source at a later time. The funding source selects the method appropriate for the invoice in box 248. When verification is complete, the funding source employee that verifies the invoice provides its identification and the date the invoice was verified in the two fields above box 248. The funding source activates the "Verify Now" button, thereby changing the invoice's verification status symbol to a green square in screen 86 (FIG. 10C).

In either single or multiple verification, selection of the "document" or "signature" verification methods change the invoice verification status to approved and the invoice's verification symbol to a green box. Selection of "verbal" or "other" requires that the funding source enter a verification note explaining how the invoice was verified. The note is entered through an "Invoice Notes" tab provided at screen 246. Until the note is entered, the invoice's verification status is "in progress," and its verification symbol is a yellow triangle. When the funding source enters the note, the verification status is approved, and the symbol is changed to a green square.

To manually verify multiple invoices, the funding source again activates the "Funding" icon for the desired client and activates the "Invoices Not Advanced" tab to present a screen 250 as shown in FIG. 31. Rather than clicking on an individual invoice, however, the funding source activates a "Multiple Invoice Verification" icon in the upper left hand corner of screen 250 to present a screen 252 shown in FIG. 32 that displays selected information about the invoices displayed in screen 250. As in single invoice verification, the screen provides "date verified," "verification method" and "verified by" fields that the funding source fills to verify an invoice. When these fields are populated for a given invoice, the funding source may select the invoice for verification by clicking the appropriate box in an "Approved" column at the right hand side of screen 252. After selecting all invoices desired for verification, the funding source clicks a "Submit and Save" button 254 to change the verification status of the selected invoices and to change their verification symbols to green squares. If the funding source clicks the "DNA" (Do not advance) box for any invoice, its verification symbol changes to a black rectangle. If "DNA" is entered for any invoice, the funding source should also enter an explanatory note. Verification notes appear in a designated column on the right side of screen 252.

If the invoices shown in screen 252 have been identified by the funding source as not requiring verification, a "Select All" box appears at the top of the screen. By selecting the box, the funding source approves all such invoices.

To enter the verification method in screen 252, the funding source double clicks in the space for the appropriate invoice in the "Verification Method" column. This presents a pull-down list of the same options discussed above with respect to single invoice verification.

In the example shown in FIG. 32, the first invoice was verified manually by a funding source administration. Automatic verification was attempted by the funding administrator system but was unsuccessful. This creates a blue arrow in the verification column to indicate that the funding source must manually verify the invoice.

When the funding source enters automatic verification criteria, the system automatically verifies invoices for which a tracking number is entered. Entry of the tracking number is discussed above with respect to FIGS. 26 and 27. To set the automatic verification criteria, the funding source selects the appropriate client, activates a "Procedures" icon and selects an "Auto Verification" icon to present a screen 256 shown in FIG. 33. The funding source enters invoice amount ranges that define when verification by delivery and pick up is required. In the example shown, invoices between $1 and $1,000 may be considered verified when the carrier indicates that the goods have been picked up for delivery. Invoices between $1,001 and $3,000 are considered verified only when the carrier indicates that the goods have been delivered to the customer. Invoices greater than $3,000 must be manually verified. When the funding source saves the information in screen 256, the system thereafter automatically attempts to verify all submitted invoices for which a tracking number is entered.

The tracking number identifies the carrier. As discussed above with respect to FIG. 1, the system periodically, for example every half hour, searches pre-selected carrier databases to determine the status of the tracking numbers in the client's invoices. For those invoices falling within the ranges set in screen 256, the engine updates the verification status automatically, depending on the information obtained from the carrier.

e. Advances

To access the advance information for a given client, the funding source searches for and selects the appropriate client as described above. From the client's general client screen, the funding source activates the "Funding" icon to display screen 82 as shown in FIG. 10A. As noted above, screen 82 describes all advances having been made by the funding source to the client. Clicking the "Invoices" tab displays, at screen 84 in FIG. 10B, those invoices that make up the advances shown in FIG. 10A. Activating the "Invoices Not Advanced" tab displays, at screen 86 in FIG. 10C, those invoices submitted by the client for advance but not yet advanced by the funding source.

Client requests precede funding source advances. As noted above, the client may access the system to request an advance. After login or registration to the system, the client is presented with screen 242 shown in FIG. 28. To request an advance, the client selects the "Advance Request Form" icon at the left of screen 242 to present a screen 258 shown in FIG. 34. Screen 258 lists the client's invoices that have been entered into the system by the client and/or the funding source that have not yet been advanced. If any of the invoices have been verified by the funding source, the invoice amount confirmed by the verification is listed in the "Verified Invoice Amount" column next to a column indicating the original invoice amount. Referring again to FIGS. 26 and 32, if the funding source determines during verification that the actual invoice amount is different from the original invoice amount submitted by the client, the funding source may enter this verified amount in the "Amount To Advance On" field in screen 246 or the "Invoice Advance Amount" field in screen 252.

Returning to FIG. 34, the projected advance is the verified invoice amount multiplied by the advance rate. It is not necessary that the invoices be verified for the client to request the advance. For those invoices not verified, the funding source completes verification prior to advancing funds.

To request an advance on one or more invoices shown in screen 258, the client clicks in the appropriate authorization boxes at the right hand side of the screen and clicks the "I hereby agree to advance" button at the bottom of the screen to forward the request to the funding source. The system maintains a report for each client that lists invoices available for potential advance and updates this report for each request by the client, thereby notifying the funding source of the client's request. To access the report from screen 62 (FIG. 6), the funding source activates the "Start Menu" icon, from which it successively selects "Reports," "Advance" and "Invoices Available for Potential Advance" icons. When the funding source completes the advance, the requested invoices no longer appear at screen 258.

To execute an advance, the funding source moves to screen 82 (FIG. 10A). Activation of an "Add New Advance" icon at the screen's upper left corner presents a screen 260 shown in FIG. 35A. Screen 260 requests that the funding source select a rate schedule for the advance. As discussed above, the funding source may define and name multiple rate schedules for the client. Each such schedule is listed in a pull-down box 262 from which the funding source may select the desired schedule to apply to the advance.

Once the funding source submits the rate schedule shown in screen 260, the engine presents a screen 264 shown in FIG. 35B. The engine assigns an advance number and advance code to the as-yet unpopulated advance and provides certain known information, for example the prime rate, the client's available credit, the rate profile name, the advance rate, points over the prime rate applicable for interest calculations, and the wire fee.

As noted above, the system database may hold multiple invoices submitted by the client that have not yet been advanced. Certain of these may have been entered but not yet requested for advance. Activation of the "Invoice" tab displays these invoices in a window 266 of screen 264. If the client has manually requested that invoices be advanced, for example verbally or in writing, the funding source may click on the applicable invoices in screen 266 and click the "Move Invoices" button at the bottom of screen 264. This moves the selected invoices into the group of invoices for which an advance has not yet been made but for which the client has requested an advance.

The funding source may view the requested invoices by activating the "Invoices Not Advanced" tab of screen 264. To select invoices from this list to advance, the funding source clicks on the desired advances and activates an "ok" button. This updates the upper part of screen 264, as shown in FIG. 35C.

At this point, the engine checks the advance against the business rules described above with respect to FIG. 15. If the advance violates any rule, the engine presents an error message to the funding source. The funding source, upon exiting the error message, is returned to screen 264 and may choose to cancel or modify the advance or, where permitted, override the business rule violation. To cancel the advance, the funding source clicks a "Cancel" button at the bottom of screen 264. To eliminate the offending invoices and resubmit the advance, the user clicks on those advances it wishes to remove, or clicks a "clear all" button and reselects those invoices it wishes to keep, and activates the "ok" button.

To override a rejection, the funding source activates an "Invoice Override" button at screen 264 to present a screen 268 shown in FIG. 36, clicks the "override" box for the appropriate invoice, enters an explanation of the override in an "Override Note" field, and clicks a "Submit and Save" button (not shown) above screen 268. This returns the funding source to screen 264, and the funding source may then resubmit the advance by activating the "ok" button.

As described above, the means by which funds are advanced to the client depend on the agreement between the funding source and the client. The system prints various reports to describe invoices and advances in their various stages. In one preferred embodiment, the reports engine prints a report for each advance from which the funding source may wire funds to the client.

f. Collections/Follow-Ups

As discussed above, customers pay factored invoices to the funding source. The reports engine (FIG. 1) provides several reports derived from the information contained in database 48 (FIG. 1) to aid in the collections process. The reports may be in any suitable format. For example, outstanding invoices may be reported by branch and loan officer. Loan officers may enter collection notes that are stored in the database and available through loan officer reports or collection note reports. Invoices at or near the charge back day may be listed on a single report. That is, all invoices that are within the funding source-defined period prior to the charge back date appear on the report. Reports may also list those invoices past their expected collection periods and those over one hundred twenty days due. The reports engine may also support a report that is interactive between the client and the funding source whereby the client may enter invoice collection information that may be viewed by the funding source. The funding source may also enter collection information, but this information is not available to the client. The report lists all invoices that are within the pre-defined period prior to the charge back date.

The funding source may enter action items applicable to a client or customer through "follow-up" screens. The funding source activates a "Follow-Up" icon to present a screen 270 shown in FIG. 37 that lists all action items for clients or customers, depending on the tab activated by the funding source. A green square in the left hand column of screen 270 indicates that the follow-up has been completed. A red octagon indicates that the follow-up has not been completed. To add a new action item, the funding source activates an "Add New Item" icon on a prior screen (not shown).

g. Searches

As described above, the funding source may search database 48 (FIG. 1) by invoice, payment, customer, client or branch. It should be understood by those skilled in this art that various searching mechanisms and hierarchies can be implemented to display the information described herein, and the search capability is therefore not described in detail. It should be understood, however, that status symbol conventions may be used in various search reports, for example as shown at screen 272 in FIG. 38. Screen 272 displays payment information. A red octagon in a "Posted" column indicates that the posting period has closed and that no changes can be made to the payment. A green square indicates that posting has not closed and that the payment information may be changed.

h. Remittance

The funding source may enter payment information manually or automatically for single or multiple invoices. To input a remittance manually, the funding source searches for and selects the invoice to which the payment applies, producing a screen 274 shown FIG. 39. As indicated in the screen, the funding source may post an adjustment, full payment, charge back or partial payment. By clicking on the adjustment icon, the funding source is presented with a screen that allows entry of an adjustment amount (either positive or negative) and an explanation for the adjustment, for example that the products were damaged. Upon activating a "Recalculation" button, the engine calculates fees and interest off of the adjustment amount. The funding source saves the adjustment by activating a "Save" button. The engine presents a warning message if there is not enough cash in the reserve account to handle the adjustment.

Activation of the full payment icon presents a screen by which the funding source may enter the payment amount, payment date, check number and whether the check is in-state or out-of-state. Activation of a "Save" button saves the payment information and submits the payment for posting. Activation of the charge back icon presents a screen in which the funding source may enter the charge back date and reason for charge back. Activation of a "Recalculation" button calculates fees and interest according to the rate profile selected for the advance to which the invoice belongs. The charge back is saved to the system by activation of a "Save" button.

Activation of the partial payment icon presents a screen similar to the full payment screen. Activation of the "Save" button presents the partial payment for posting. The invoice's remaining balance remains open for fees and interest accrual.

The funding source enters multiple invoice remittance by first searching for the customer that has submitted payment. Upon opening the customer information screen 216 in FIG. 21, the funding source activates a "Post Payments" icon (not shown) to move to a check payment screen at which the funding source enters the check number and payment period date. Upon activating an "ok" button, the engine presents a screen 276 shown in FIG. 40. Screen 276 lists all invoices owing by the selected customer to the client identified in screen 274. The funding source enters the check number and check amount at the top of the screen, clicks the payment box next to all desired invoices and enters the amount of the check that will be applied to each invoice. The "Payment" column defaults to full payment. Double clicking on this field opens a drop-down to select different types of options, for example partial payment. Amounts entered into the "Amount" column are subtracted from the check amount entered at the top of the screen. The funding source submits the payment for posting by activation of a "Submit and Save" button.

A green square in the "Advance" column at the left hand side of screen 276 indicates that advances have been made. A red octagon indicates that no advance has been made.

The system may also accept automatic remittance payments. The customer provides account information to the funding source and directs that payment be made automatically from its financial institution to the funding source. This information is stored by a database located at the funding source. Provided that the funding source files are in a format supported by the factoring administrator system, the funding source may download a data file to the system that includes the payment, customer, client and invoice information described above. Upon receipt of the data file, payments described therein are automatically posted.

i. Rebates

The reserve account is made up of rebate debits and credits resulting from invoice payments relative to the client's advance rate and reserve debit and credits resulting from fees charged to clients, charge backs, and unapplied cash. The system provides a screen accessible by the funding source that lists all rebates that are payable to a given client. The screen lists rebates by invoice/by payment and lists the customer, invoice number, payment type, date, the rebate payable to the client, the amount paid by the funding source to the client on the payable rebate, the date the rebate was paid and the code of the advance that covers the invoice. If a rebate is negative, the funding source owes the rebate to the client. If the rebate is positive, the client owes the rebate to the funding source. The screen also lists adjustments, payments of unapplied cash and fees. Charge backs are considered positive rebates and are also listed.

The funding source may enter transactions affecting the reserve account. From the general client screen, the funding source successively activates "Funding," "Reserve" and "Transaction Detail List" icons to present a screen 278 shown in FIG. 41A. The screen lists transactions, for example adjustments and applications of unapplied cash, to the reserve account. To add a new transaction, the funding source activates an "Add New Transaction" icon at the upper left corner of screen 278 to present a screen 280 shown in FIG. 41B. In the example shown in FIG. 41B, a customer has submitted a payment check on an invoice that has not yet been factored. The payment increases the client's reserve account and should be returned as a rebate to the client.

To pay a rebate, the funding source activates a "Pay Rebate" icon following the "Reserve" icon. This presents a screen that lists all rebates applicable to the client and from which the funding source selects rebates for payment. By clicking an "ok" button on this screen, the rebates are submitted for posting, and the funding source may print rebate reports so that rebate funds may be transferred to the client according to means agreed to between the client and the funding source.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

APPENDIX 1

1. Client Location Information
    a. Code (automatically input by system)
    b. Primary Address
    c. Secondary Address
    d. City
    e. State (pull-down)
    f. Zip Code
    g. Primary Mailing Address
    h. Secondary Mailing Address
    i. Mailing City
    j. Mailing State (pull-down)
    k. Mailing Zip Code
2. Client Principal
    a. Last Name
    b. First Name
    c. Middle Name
    d. Title
    e. Drivers License Number
    f. Primary Address
    g. Secondary Address
    h. City
    i. State (pull-down)
    j. Zip Code
    k. Home Phone Number
    l. SSN
    m. Date of Birth
    n. Percent Ownership in Client
    o. Home Owner (pull-down)
3. Accountant
    a. Name
    b. Firm
    c. Phone Number
    d. Address
    e. City
    f. State (pull-down)
    g. Zip Code
4. Attorney
    a. Name
    b. Firm
    c. Phone Number
    d. Address
    e. City
    f. State (pull-down)
    g. Zip Code
5. Insurance
    a. Agent Name
    b. Agency Name
    c. Phone Number
    d. Address
    e. City
    f. State (pull-down)
    g. Zip Code
6. Landlord
    a. Name
    b. Phone Number
    c. Address
    d. City
    e. State (pull-down)
    f. Zip Code
    g. Leased Space (pull-down)
    h. Monthly Lease Amount
7. Business Checking
    a. Bank Name
    b. Address
    c. City
    d. State (pull-down)
    e. Zip Code
    f. Account Opened Date
    g. Account Number
    h. Bank Officer
    i. Phone Number
8. Personal Checking
    a. Bank
    b. Address
    c. City
    d. State (pull-down)
    e. Zip Code
    f. Account Opened Date
    g. Account Number
    h. Account Name
9. Loan References
    a. Bank
    b. Address
    c. city
    d. State (pull-down)
    e. Zip Code
    f. Date Loan Opened g. How Long With Institution
h. Loan Amount
i. Collateral 10. Funding
    a. Type of Business
    b. Open Receivables Amount
    c. Average Monthly Sales
    d. Number of Customers
    e. Terms of Sale
    f. Monthly Discounting Amount
    g. Maximum Anticipated Funding
    h. Previously Discounted Invoices (pull-down)
    i. Previously Funded With
    j. Are Receivables Currently Pledged? (pull-down)
    k. Receivables Pledged with Whom?

11. Tax
    a. Federal Tax ID No.
    b. State Tax ID No.
    c. Local Tax ID No.
    d. Financial Statements Prepared Regularly (pull-down)
    e. Last Financial Statement
    f. Financial Statement Period (pull-down)
    g. Financial Statement Copy Provided (pull-down)
    h. Any Customers Buy on Contra Basis (pull-down)
    i. Payroll Tax Period (pull-down)
    j. Number of Employees
    k. Payroll Tax Past Due (pull-down)
    l. Payroll Taxes Past Due List 12. Notes
    a. Note Text
    b. Referral Source
    c. Funding Account Number
    d. Brokered Account (pull-down)
    e. Broker Terms
    f. Batch Advance (pull-down)
    g. Batch Payment (pull-down)
    h. Batch Rebate (pull-down)

13. Procedure Information
    a. Procedure Description (text block)

14. Broker—General
    a. Broker Name
    b. Code
    c. Company
    d. Address
    e. Phone Number
    f. Fax Number
    g. E-mail Address
    h. Client Status (pull-down)
    i. Note Text
    j. Fee Type (pull-down)
    k. Broker Fee Split

APPENDIX 2

| Fee Type | Description |
| --- | --- |
| Administrative Fee | client admin. fee (Invoice) |
| Administrative Fee | client admin. fee (Payment) |
| Administrative Fee | client admin. fee (Advance) |
| Borrowing Base | client borrowing base |
| Commission | client commission fees |
| Commitment Fee | client commitment fee |
| Discount | client discount fees |
| Float Days | client float days |
| Guarantee Fee | client guarantee fee |
| Insurance Fee | client insurance fee |

APPENDIX 2-continued

| Fee Type | Description |
| --- | --- |
| Interest | client interest |
| Minimum Advance Charge | client minimum advance charge |
| Processing Fee | client processing fee (Invoice) |
| Processing Fee | client processing fee (Payment) |
| Processing Fee | client processing fee (Advance) |
| Setup Fee | client setup fee |
| Transaction Fee | client transaction fee (Invoice) |
| Transaction Fee | client transaction fee (Payment) |
| Transaction Fee | client transaction fee (Advance) |
| Wire Fee | client wire |

What is claimed is:

1. A computerized system for facilitating proposed factoring transactions between a funding source and a client in which the funding source advances funds to the client based on accounts receivable to the client by one or more customers on one or more invoices, said system comprising:
    database hardware having a database storing data that describes a plurality of invoices that are owing to one or more clients by one or more customers, said data for each said invoice including an identity of a said client to which the invoice is owed, an identity of a said customer owing on the invoice and an amount of said invoice; and
    a processor at which is executable a computer program that supports at least one rule that determines, based on the data, a state of a predefined parameter that is a condition to factoring the plurality of invoices and that is configured to
        receive instructions from a first said client to submit one or more first said invoices to a funding source for an advance of funds on accounts receivable on the one or more first invoices,
        provide the funding source access to the data describing each said first invoice, and
        determine, according to the at least one rule, the state of the predefined parameter for each said first invoice,
        when the funding source accesses the data of the one or more first invoices, display, in association with each said first invoice, a predetermined symbol that identifies the state of the parameter,
        receive instructions from the funding source indicating selection of a said first invoice for advance of funds, and
        provide the funding source access to data describing the selected first invoice, indicating that funds have been advanced against the selected first invoice.

2. The system as in claim 1, wherein the one or more clients are remote from the computer program and the computer program is configured to receive the instructions from said one or more clients through a distributed computer system.

3. The system as in claim 2, wherein the funding source is remote from the computer program and the computer program is configured to provide said access to the funding source via a distributed computer system.

4. The system as in claim 1, wherein the at least one rule determines a state of each of a plurality of said predefined parameters for each said first invoice, and wherein a first said parameter describes whether a said first invoice associated with the first parameter has been verified as a valid invoice.

5. The system as in claim 4, wherein the data includes an identity of a carrier of goods transferred under the associated first invoice.

6. The system as in claim 5, wherein the computer program is configured to receive confirmation that the funding source is in possession of, and a shipping status of, the goods with the carrier and to set the state of the first parameter responsively thereto according to a first said rule.

7. The system as in claim 6, wherein the first rule relates predefined levels of the invoice amount to predefined shipping status levels so that the state of the first parameter for the associated first invoice depends on the invoice amount of the associated first invoice and upon whether the associated first invoice has attained a said shipping status level related to the invoice amount of the associated first invoice by the first rule.

8. The system as in claim 1, wherein the at least one rule determines a state of each of a plurality of said predefined parameters for each said first invoice, and wherein a first said parameter describes whether an agreement exists, between the funding source and a first said customer owing on a said first invoice associated with the first parameter, in which the first customer agrees to pay to the funding source amounts owed by the first customer on invoices on which funds have been advanced by the funding source.

9. The system as in claim 8, wherein the database stores agreement data for each said customer describing whether the customer has executed a said agreement with the funding source and, if not, whether the funding source has attempted to obtain said agreement with the customer, and wherein a first said rule associates one of a plurality of the predetermined symbols to the first parameter based upon the agreement data for the customer identified by the data.

10. The system as in claim 1, wherein the at least one rule determines a state of each of a plurality of said predetermined parameters for each said first invoice, and wherein a first said parameter describes whether a first said client to which a said first invoice associated with the first parameter is owed is credit-worthy.

11. The system as in claim 10, wherein the database stores client data for each said client describing the client's business and financial history, wherein a first said rule includes a scoring algorithm defined by the funding source that produces a credit score based upon the client data, wherein the first rule relates the score to predetermined credit levels, and wherein the first rule associates one of a plurality of said predetermined symbols to the first parameter based upon comparison of the score to a credit level requested by the first client.

12. The system as in claim 1, wherein the at least one rule determines a state of each of a plurality of said predetermined parameters for each said first invoice, and wherein a first said parameter describes whether a said first invoice associated with the first parameter has been paid.

13. The system as in claim 1, wherein the parameter may have any of a plurality of predetermined said states and wherein the predetermined symbol may be any of a plurality of predetermined colors corresponding to respective said states.

14. The system as in claim 1, wherein the parameter may have any of a plurality of predetermined said states and wherein the predetermined symbol may be any of a plurality of predetermined shapes corresponding to respective said states.

15. The system as in claim 1, wherein the parameter may have any of a plurality of predetermined said states and wherein the predetermined symbol may have any of a plurality of predetermined combinations of shapes and colors corresponding to respective said states.

16. The system as in claim 1, wherein the database stores client data for each said client that describes the client's business and financial history, customer data for each said customer that describes the customer's business history with one or more said clients, and financing terms for each said client upon which the funding source is willing to advance funds to the client on the client's invoices, the financing terms including a fee schedule, an advance rate and a charge back period.

17. The system as in claim 16, wherein the computer program is configured to, for a said selected first invoice upon which the funding source has chosen to advance funds to the first client, determine
an amount of advanced funds based on the advance rate for the first client,
a charge back time based on the charge back period for the first client, and
factoring fees based on the fee schedule for the first client, and to
store the amount of advanced funds, the charge back time and the factoring fees in the database in association with the selected first invoice.

18. A computerized method of facilitating proposed factoring transactions between a funding source and a client in which the funding source advances funds to the client based on accounts receivable to the client by one or more customers on one or more invoices, said method comprising the steps of:

providing database hardware having a database;
providing a processor at which is executable a computer program;
storing, in the database, data describing a plurality of invoices that are owing to one or more clients by one or more customers, the data for each said invoice including an identity of a said client to which the invoice is owed, an identity of a said customer owing on the invoice and an amount of the invoice;
establishing at least one rule that determines, based on the data, a state of a predefined parameter that is a condition to factoring the plurality of invoices;
where a first said client has chosen one or more first said invoices to submit to a funding source for an advance of funds on accounts receivable on the one or more first invoices,
providing the funding source access through the computer program to the data describing each said first invoice, and
determining via the computer program, according to the at least one rule, the state of the predefined parameter for each said first invoice;
when the funding source accesses the data of the one or more first invoices, displaying via the computer program, in association with each said first invoice, a predetermined symbol that identifies the state of the parameter;
receiving instructions from the funding source via the computer program indicating selection of a said first invoice for advance of funds; and
providing the funding source access via the computer program to data describing the selected first invoice, indicating that funds have been advanced against the selected first invoice.

19. The method as in claim 18, wherein the at least one rule determines a state of each of a plurality of said predefined parameters for each said first invoice, and wherein a first said parameter describes whether a said first invoice associated with the first parameter has been verified as a valid invoice.

20. The method as in claim 19, wherein the data includes an identity of a carrier of goods transferred under the associated first invoice.

21. The method as in claim 20, wherein, in said determining step, the funding source confirms possession and shipping status of the goods with the carrier via the computer program and wherein the state of the first parameter is set responsively thereto according to a first said rule.

22. The method as in claim 21, wherein the first rule relates predefined levels of the invoice amount to predefined shipping status levels so that the state of the first parameter for the associated first invoice depends on the invoice amount of the associated first invoice and upon whether the associated first invoice has attained a said shipping status level related to the invoice amount of the associated first invoice by the first rule.

23. The method as in claim 18, wherein the at least one rule determines a state of each of a plurality of said predefined parameters for each said first invoice, and wherein a first said parameter describes whether an agreement exists, between the funding source and a first said customer owing on a said first invoice associated with the first parameter, in which the first customer agrees to pay to the funding source amounts owed by the first customer on invoices on which funds have been advanced by the funding source.

24. The method as in claim 23, wherein said storing step includes storing in the database agreement data for each said customer describing whether the customer has executed a said agreement with the funding source and, if not, whether the funding source has attempted to obtain said agreement with the customer, and wherein a first said rule associates one of a plurality of said predetermined symbols to the first parameter based upon the agreement data for the customer identified by said the data.

25. The method as in claim 18, wherein the at least one rule determines a state of each of a plurality of said predefined parameters for each said first invoice, and wherein a first said parameter describes whether a first said client to which a said first invoice associated with the first parameter is owed is credit-worthy.

26. The method as in claim 25, wherein said storing step includes storing in the database client data for each said client describing the client's business and financial history, wherein a first said rule includes a scoring algorithm defined by the funding source that produces a credit score based upon the client data, wherein the first rule relates the score to predetermined credit levels, and wherein the first rule associates one of a plurality of said predetermined symbols to the first parameter based upon comparison of the score to a credit level requested by the first client.

27. The method as in claim 18, wherein the at least one rule determines a state of each of a plurality of said predetermined parameters for each said first invoice, and wherein a first said parameter describes whether a said first invoice associated with the first parameter has been paid.

28. The method as in claim 18, wherein the parameter may have any of a plurality of predetermined said states and wherein the predetermined symbol may be any of a plurality of predetermined colors corresponding to respective said states.

29. The method as in claim 18, wherein the parameter may have any of a plurality of predetermined said states and wherein the predetermined symbol may be any of a plurality of predetermined shapes corresponding to respective said states.

30. The method as in claim 18, wherein the parameter may have any of a plurality of predetermined said states and wherein the predetermined symbol may have any of a plurality of predetermined combinations of shapes and colors corresponding to respective said states.

31. The method as in claim 18, wherein said storing step includes
storing client data for each said client that describes the client's business and financial history,
storing customer data for each said customer that describes the customer's business history with one or more said clients, and
storing financing terms for each said client upon which the funding source is willing to advance funds to the client on the client's invoices, the financing terms including a fee schedule, an advance rate and a charge back period.

32. The method as in claim 31, wherein, for a said first invoice upon which the funding source has chosen to advance funds to the first client, the method comprises the steps of
determining via the computer program
an amount of advanced funds based on the advance rate for the first client,
a charge back time based on the charge back period for the first client and
factoring fees based on the fee schedule for the first client and
storing the amount of advanced funds, the charge back time and the factoring fees in the database in association with the selected first invoice.

33. The method as in claim 31, wherein the funding source, prior to the receiving step and where the funding source has not previously factored invoices for the first client, reviews the client data and the customer data via the computer program and determines via the computer program whether to accept the first client for consideration of its invoices for factoring.

34. The method as in claim 18, wherein
said storing step comprises storing, in the database,
client data for each said client that describes the client's business and financial history,
customer data for each said customer that describes the customer's business history with one or more said clients, and
financing terms for each said client upon which the funding source is willing to advance funds to the client on the client's invoices, the financing terms including a fee schedule, an advance rate and a charge back period, and
wherein the establishing step comprises establishing, at a third party factoring administrator computer program accessible over a distributed computer system, the at least one rule, and
wherein the method comprises the step of, prior to the providing step, receiving, at said factoring administrator computer program through the distributed computer system, a request from the first client that the one or more first invoices be submitted to the funding source for the advance of funds, and
wherein the method comprises the step of, prior to the determining step, selecting the one or more first invoices in the database, and
wherein the providing step comprises providing the funding source access, at the factoring administrator computer program through the distributed computer system, to the data describing the one or more first invoices, and
for a said first invoice upon which the funding source has chosen to advance funds to the first client, determining at the factoring administrator computer program
an amount of advanced funds based on the advance rate for the first client, a charge back time based on the charge back period for the first client, and factoring fees based on the fee schedule for the first client; and storing the amount of advanced funds, the charge back time and the factoring fees in the database in association with the selected first invoice.

35. The method as in claim 34, wherein said providing step includes providing the funding source access to the client data for the first client and the customer data for the customers owing on the one or more first invoices.

36. A computerized system for facilitating proposed factoring transactions between a funding source and a client in which the funding source advances funds to the client based on accounts receivable to the client by one or more customers on one or more invoices, said system comprising:

a database on a computer, the database storing data that describes a plurality of invoices that are owing to one or more clients by one or more customers, said data for each said invoice including an identity of a said client to which the invoice is owed, an identity of a said customer owing on the invoice and an amount of said invoice; and a computer program on a computer, the computer program supporting at least one rule that determines, based on the data, a state of a predefined parameter that is a condition to factoring the plurality of invoices and that is configured to receive instructions from a first said client to submit one or more first said invoices to a funding source for an advance of funds on accounts receivable on the one or more first invoices, provide the funding source access to the data describing each said first invoice, and determine, according to the at least one rule, the state of the predefined parameter for each said first invoice, and when the funding source accesses the data of the one or more first invoices, display, in association with each said first invoice, a predetermined symbol that identifies the state of the parameter, and receive instructions from the funding source indicating selection of a said first invoice for advance of funds, and provide the funding source access to data describing the selected first invoice, indicating that funds have been advanced against the selected first invoice.

37. The system as in claim 36, wherein the one or more clients are remote from the computer program and the computer program is configured to receive the instructions from said one or more clients through a distributed computer system.

38. The system as in claim 37, wherein the funding source is remote from the computer program and the computer program is configured to provide said access to the funding source via a distributed computer system.

39. The system as in claim 36, wherein the at least one rule determines a state of each of a plurality of said predefined parameters for each said first invoice, and wherein a first said parameter describes whether a said first invoice associated with the first parameter has been verified as a valid invoice.

40. The system as in claim 39, wherein the data includes an identity of a carrier of goods transferred under the associated first invoice.

41. The system as in claim 40, wherein the computer program is configured to receive confirmation that the funding source is in possession of, and a shipping status of, the goods with the carrier and to set the state of the first parameter responsively thereto according to a first said rule.

42. The system as in claim 41, wherein the first rule relates predefined levels of the invoice amount to predefined shipping status levels so that the state of the first parameter for the associated first invoice depends on the invoice amount of the associated first invoice and upon whether the associated first invoice has attained a said shipping status level related to the invoice amount of the associated first invoice by the first rule.

43. The system as in claim 36, wherein the at least one rule determines a state of each of a plurality of said predefined parameters for each said first invoice, and wherein a first said parameter describes whether an agreement exists, between the funding source and a first said customer owing on a said first invoice associated with the first parameter, in which the first customer agrees to pay to the funding source amounts owed by the first customer on invoices on which funds have been advanced by the funding source.

44. The system as in claim 43, wherein the database stores agreement data for each said customer describing whether the customer has executed a said agreement with the funding source and, if not, whether the funding source has attempted to obtain said agreement with the customer, and wherein a first said rule associates one of a plurality of the predetermined symbols to the first parameter based upon the agreement data for the customer identified by the data.

45. The system as in claim 36, wherein the at least one rule determines a state of each of a plurality of said predetermined parameters for each said first invoice, and wherein a first said parameter describes whether a first said client to which a said first invoice associated with the first parameter is owed is credit-worthy.

46. The system as in claim 45, wherein the database stores client data for each said client describing the client's business and financial history, wherein a first said rule includes a scoring algorithm defined by the funding source that produces a credit score based upon the client data, wherein the first rule relates the score to predetermined credit levels, and wherein the first rule associates one of a plurality of said predetermined symbols to the first parameter based upon comparison of the score to a credit level requested by the first client.

47. The system as in claim 36, wherein the at least one rule determines a state of each of a plurality of said predetermined parameters for each said first invoice, and wherein a first said parameter describes whether a said first invoice associated with the first parameter has been paid.

48. The system as in claim 36, wherein the parameter may have any of a plurality of predetermined said states and wherein the predetermined symbol may be any of a plurality of predetermined colors corresponding to respective said states.

49. The system as in claim 36, wherein the parameter may have any of a plurality of predetermined said states and wherein the predetermined symbol may be any of a plurality of predetermined shapes corresponding to respective said states.

50. The system as in claim 36, wherein the parameter may have any of a plurality of predetermined said states and wherein the predetermined symbol may have any of a plurality of predetermined combinations of shapes and colors corresponding to respective said states.

51. The system as in claim 36, wherein the database stores client data for each said client that describes the client's business and financial history, customer data for each said customer that describes the customer's business history with one or more said clients, and financing terms for each said client upon which the funding source is willing to advance funds to the client on the client's invoices, the financing terms including a fee schedule, an advance rate and a charge back period.

52. The system as in claim 51, wherein the computer program is configured to, for a said selected first invoice upon which the funding source has chosen to advance funds to the first client, determine
   an amount of advanced funds based on the advance rate for the first client,
   a charge back time based on the charge back period for the first client, and
   factoring fees based on the fee schedule for the first client, and to store the amount of advanced funds, the charge back time and the factoring fees in the database in association with the selected first invoice.

\* \* \* \* \*

UNITED STATES PATENT AND TRADEMARK OFFICE
CERTIFICATE OF CORRECTION

PATENT NO.        : 7,617,146 B2                                    Page 1 of 1
APPLICATION NO.   : 09/947062
DATED             : November 10, 2009
INVENTOR(S)       : Keaton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2029 days.

Signed and Sealed this

Fourteenth Day of December, 2010

David J. Kappos
*Director of the United States Patent and Trademark Office*